US012400516B2

(12) United States Patent
Jones et al.

(10) Patent No.: US 12,400,516 B2
(45) Date of Patent: Aug. 26, 2025

(54) SECURITY AUTHENTICATION FRAMEWORKS FOR CROWDSOURCED GAMING SYSTEMS, METHODS, AND TECHNIQUES

(71) Applicant: Parlayworld LLC, Boca Raton, FL (US)

(72) Inventors: Michael Scott Jones, Boca Raton, FL (US); Julius Adrian Staniewicz, Delray Beach, FL (US)

(73) Assignee: PARLAYWORLD LLC, Boca Raton, FL (US)

( * ) Notice: Subject to any disclaimer, the term of this patent is extended or adjusted under 35 U.S.C. 154(b) by 0 days.

(21) Appl. No.: 18/781,537

(22) Filed: Jul. 23, 2024

(65) Prior Publication Data

US 2025/0095439 A1 Mar. 20, 2025

Related U.S. Application Data

(60) Provisional application No. 63/538,729, filed on Sep. 15, 2023.

(51) Int. Cl.
*G07F 17/32* (2006.01)

(52) U.S. Cl.
CPC ...... *G07F 17/3237* (2013.01); *G07F 17/3218* (2013.01); *G07F 17/3225* (2013.01); *G07F 17/3227* (2013.01); *G07F 17/3241* (2013.01); *G07F 17/3288* (2013.01); *G07F 17/3223* (2013.01); *G07F 17/3244* (2013.01)

(58) Field of Classification Search
CPC ............. G07F 17/3237; G07F 17/3288; G07F 17/3227; G07F 17/3218; G07F 17/3244; G07F 17/3225; G07F 17/3241; G07F 17/3223
See application file for complete search history.

(56) References Cited

U.S. PATENT DOCUMENTS

| | | | | |
|---|---|---|---|---|
| 8,057,298 | B2 | 11/2011 | Nguyen et al. | |
| 8,526,912 | B2 | 9/2013 | Quade | |
| 9,489,793 | B2 * | 11/2016 | Williams | G07F 17/3218 |
| 9,992,187 | B2 | 6/2018 | Lu et al. | |
| 10,124,260 | B2 | 11/2018 | Harris et al. | |
| 10,292,051 | B2 | 5/2019 | Kusens et al. | |
| 10,515,511 | B2 * | 12/2019 | Amaitis | G07F 17/3288 |
| 10,592,872 | B2 | 3/2020 | Fosmark et al. | |

(Continued)

*Primary Examiner* — William H McCulloch, Jr.
(74) *Attorney, Agent, or Firm* — Kevin Paganini, Esq.

(57) ABSTRACT

This disclosure is related to improved security authentication frameworks for crowdsourced gaming systems that facilitate collaboration among multiple virtual participants over a network. In certain embodiments, an electronic gaming platform includes a geolocation authentication system that authenticates, verifies, and authorizes virtual user participants prior to accepting submissions in virtual multi-participant contests hosted by the electronic gaming platform. The geolocation authentication system can transition collaborative gaming applications operated by virtual user participants between a restricted functionality state that locks one or more functionalities pertaining to the virtual multi-participant contests hosted by the electronic platform and an unrestricted functionality state that unlocks one or more functionalities pertaining to the virtual multi-participant contests.

19 Claims, 14 Drawing Sheets

(56) References Cited

U.S. PATENT DOCUMENTS

| | | | | |
|---|---|---|---|---|
| 10,672,226 | B2 * | 6/2020 | Pierce | G07F 17/3244 |
| 10,673,843 | B2 | 6/2020 | Cho et al. | |
| 10,917,405 | B2 | 2/2021 | Nowak et al. | |
| 11,017,628 | B2 * | 5/2021 | Burman | H04L 63/107 |
| 11,017,630 | B2 * | 5/2021 | Williams | G07F 17/3241 |
| 11,308,764 | B1 | 4/2022 | Seidel et al. | |
| 11,373,483 | B1 | 6/2022 | Seidel et al. | |
| 11,375,435 | B2 | 6/2022 | Yang | |
| 11,562,629 | B2 * | 1/2023 | Miller | G07F 17/3293 |
| 11,622,156 | B1 * | 4/2023 | Mendell | H04N 21/4532 463/25 |
| 11,861,977 | B2 | 1/2024 | Petersen et al. | |
| 12,155,900 | B2 * | 11/2024 | Mendell | H04N 21/2187 |
| 2007/0087804 | A1 * | 4/2007 | Knowles | G07F 17/3288 463/43 |
| 2007/0155507 | A1 * | 7/2007 | Gatto | G07F 17/32 463/42 |
| 2008/0113807 | A1 * | 5/2008 | Alderucci | G07F 17/3232 463/42 |
| 2008/0139306 | A1 * | 6/2008 | Lutnick | G07F 17/32 463/30 |
| 2015/0024816 | A1 * | 1/2015 | Ehrens | A63F 13/40 463/9 |
| 2017/0069167 | A1 | 3/2017 | Hafezi | |
| 2018/0089939 | A1 | 3/2018 | Lyons et al. | |
| 2022/0122425 | A1 * | 4/2022 | Shore | G07F 17/3248 |
| 2022/0351581 | A1 * | 11/2022 | Miller | G07F 17/3237 |
| 2023/0154288 | A1 * | 5/2023 | Mangan | G07F 17/3288 463/40 |
| 2023/0222878 | A1 * | 7/2023 | Putnam | G07F 17/3218 463/25 |
| 2023/0394930 | A1 * | 12/2023 | Shore | G07F 17/3237 |
| 2024/0046742 | A1 * | 2/2024 | Steinberg | G07F 17/323 |
| 2025/0095439 | A1 * | 3/2025 | Jones | G07F 17/3237 |

* cited by examiner

200B

700A

SECURITY AUTHENTICATION FRAMEWORKS FOR CROWDSOURCED GAMING SYSTEMS, METHODS, AND TECHNIQUES

CROSS-REFERENCE TO RELATED APPLICATIONS

This application claims benefit of, and priority to, U.S. Provisional Patent Application No. 63/538,729 filed on Sep. 15, 2023. The content of the above-identified application is herein incorporated by reference in its entirety.

TECHNICAL FIELD

This disclosure is related to improved security authentication frameworks for crowdsourced gaming systems that facilitate collaboration among multiple virtual participants over a network. In certain embodiments, a centralized, electronic gaming platform includes a geolocation authentication system that authenticates, verifies, and authorizes virtual users prior to accepting submissions in virtual multi-participant contests hosted by the electronic gaming platform. In certain embodiments, the geolocation authentication system can provide a region-agnostic authentication framework that facilitates collaboration among virtual participants in regions having different location-specific authorization protocols.

BACKGROUND

Various online gaming platforms enable participants to electronically enter submissions into virtual contests. In many scenarios, virtual contests can be based on outcomes of live sporting events (e.g., horse racing, football games, baseball games, basketball games, soccer games, tennis matches, etc.). Virtual participants accessing an online gaming platform may enter submissions in various types of virtual contests. For example, virtual participants can enter submissions in individual contests, which determine a win or loss based on the outcome or result of a single contest (e.g., whether a team wins, loses, or covers a spread). In some scenarios, the virtual participants also can enter submissions in combination contests (e.g., such as parlays, teasers, etc.) that combine multiple individual contests into a single, combined contest. Typically, for a given combination contest, a submission is determined to be a winner only if all individual contests are accurately predicted or, alternatively, determined to be a loser if at least one of the individual contests is not accurately predicted.

Traditional online gaming platforms do not permit multiple participants to collaborate on combination contests. For example, for given a parlay combination contest comprised of four individual contests, a single virtual participant is typically required to enter submissions for all four contests. The same applies to teaser contests and other types of combination contests. The lack of collaborative functionality diminishes user experiences with respect to utilizing the online gaming platforms, and prevents users from collaborating on virtual contests with friends, family or other individuals. Additionally, a single virtual participant is required to accept all of the risk associated with combination contests.

Traditional online gaming platforms are unable to facilitate collaboration on combination contests for a variety of technical challenges. Amongst other things, these platforms are not equipped with a technological framework that provides appropriate security or authentication protocols to enable multiple participants to participate in combination contests. Implementing appropriate security or authentication protocols to facilitate such collaboration can be technically challenging for various reasons. Amongst other things, virtual participants desiring to collaborate in multi-participant combination contests can be located in various geographical regions, some of which permit online gaming and some which prohibit online gaming. Additionally, even in scenarios where all participants are located in geographical regions that permit online gaming, each geographic region may have location-specific authentication requirements that differ from other geographic regions. Thus, providing a framework that addresses these complex, heterogenous authentication requirements across multiple geographic regions, and which ensures that all participants are authorized users, can be technically challenging.

In view of the foregoing, there is a need for an improved online gaming platform that includes a technological framework for implementing security and authentication protocols to enable multiple participants to collaborate in combination contests.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

BRIEF DESCRIPTION OF DRAWINGS

To facilitate further description of the embodiments, the following drawings are provided, in which like references are intended to refer to like or corresponding parts, and in which.

DETAILED DESCRIPTION OF EXEMPLARY EMBODIMENTS

Figure 1A:
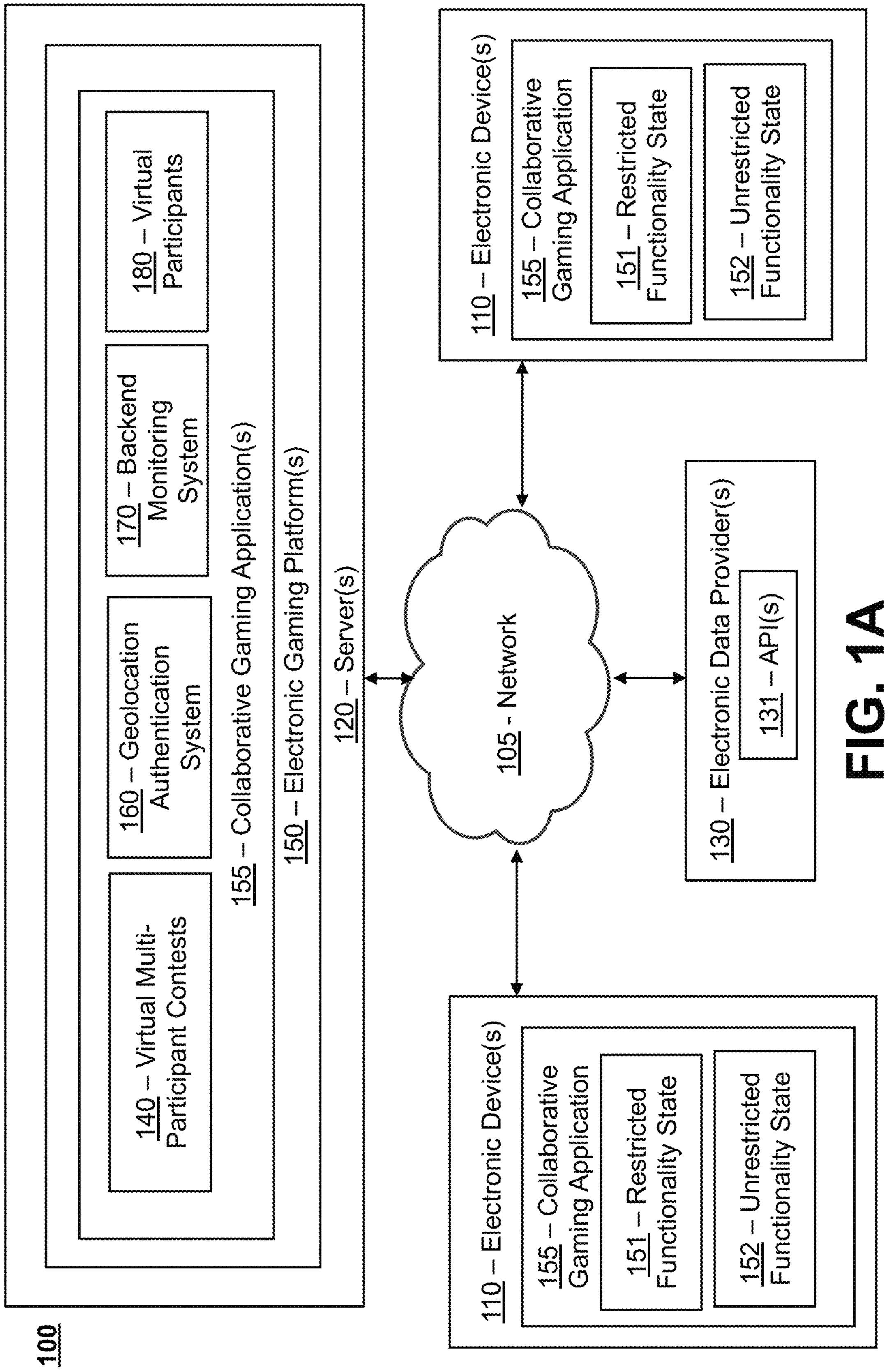
FIG. 1A is a block diagram of an exemplary system in accordance with certain embodiments.

The present disclosure relates to systems, methods, apparatuses, and techniques for providing virtual multi-player gaming contests and authenticating virtual participants for the same. In certain embodiments, an electronic gaming platform includes a geolocation authentication system that is configured to execute various functions in connection with authenticating virtual participants. Each of the virtual participants can operate an electronic device that stores, executes, and/or accesses a collaborative gaming application associated with the electronic gaming platform. The collaborative gaming application can be configured in a restricted functionality state that locks, or prevents access to, one or more functionalities provided by the electronic gaming platform. In response to the geolocation authentication system determining that a corresponding virtual participant is an authorized user, the collaborative gaming application can be transitioned to an unrestricted functionality state. In the unrestricted functionality state, the virtual participant can access various functionalities associated with creating, joining, monitoring, and/or managing virtual multi-participant contests.

Additionally, in some embodiments, the electronic gaming platform also can be configured to promote collaboration among virtual participants in a region-agnostic fashion, such that virtual participants located in distinct geographic areas with varying location-specific authentication protocols can enter virtual stake submissions into the same virtual multi-participant contest. The geolocation authentication system can store separate location-specific authentication protocols for each of a plurality of geographic regions. When a virtual participant accesses the electronic gaming platform, the geolocation authentication system can detect the virtual participant's location, retrieve location-specific authentication protocols applicable to the virtual participant's location, and authenticate the virtual participant using the location-specific authentication protocols corresponding to the location. Moreover, various activities performed by the virtual participant (e.g., such entering virtual stake submissions, receiving winning allocations, etc.) can be managed, at least in part, according to the location-specific authentication protocols applicable to the virtual participant's current location.

As explained in further detail below, the electronic gaming platform can be configured to host and manage various types of virtual multi-participant contests and provide authorized users with access to the virtual contests. In many embodiments, the electronic gaming platform can host and manage virtual parlay contests and/or virtual teaser contents, as well as other types of combination contests that package individual contests into a single outcome or bundle. Each of the multi-participant contests can be comprised of a plurality of individual contests, and each can be configured to permit multiple authorized participants to enter virtual stake submissions for individual contests into a corresponding combination contest. In this manner, the electronic gaming platform provides functionality that promotes collaboration among virtual participants situated in remote geographic regions and, in some configurations, spreads the risks associated with combination contests across multiple participants, while simultaneously ensuring that all authentication and security protocols are satisfied.

In certain embodiments, the electronic gaming platform includes a crowdsourcing framework that facilitates connectivity among virtual participants, and which crowdsources entries or submissions for the virtual multi-participant contests from authorized virtual participants situated in different geographic regions. As described above, traditional gaming systems only permit a single participant to select all individual contests included in a combination contest. In contrast, the crowdsourcing framework facilitates visibility, collaboration, and participation across multiple virtual participants in a given virtual combination contest. The crowdsourcing framework can be configured to cooperate with the geolocation authentication system that employs secure, authenticated connectivity protocols to ensure submissions in a given virtual combination contest are only received from authorized users.

The electronic gaming platform also can be configured to provide virtual multi-participant contests in a variety of unique configurations and formats. In some examples, the virtual multi-participant contests can be configured in vacancy tolerant mode and/or vacancy intolerant mode based on definition criteria specified for the virtual multi-participant contests. In the vacancy tolerant mode, each virtual stake submission entered by a virtual participant is locked after entry into the virtual multi-participant parlay contest, and the multi-participant virtual contest remains open or active in scenarios where less than all virtual stake submissions have been received prior to an occurrence of a live event associated with the virtual multi-participant contest. In the vacancy intolerant mode, a multi-participant virtual contest only remains active if virtual stake submissions are received for all individual contests prior to the first occurrence of any live event associated with the virtual multi-participant contest. Further details relating to these and other operational modes for the virtual multi-participant contests are described below.

In certain embodiments, the electronic gaming platform can include a backend monitoring system executes functions associated with monitoring, tracking, and managing virtual contests hosted on or by the electronic gaming platform. The backend monitoring system can include a workload analyzer configured to perform an aggregated analysis across all ongoing virtual contests to identify live events (e.g., ongoing live events and/or upcoming live events), or outcomes of live events, that create substantial exposure for electronic gaming platform. The analysis performed by the workload analyzer can include unique functionalities that account for the complexities in identifying and calculating exposure levels for virtual combination contests (including virtual parlay contests and virtual teaser contests). Any exposure-creating events identified by the workload analyzer can be highlighted for review, and administrative users can access various remediation functions shown or highlighted by system to mitigate or reduce the exposure of the electronic gaming platform.

As evidenced by the disclosure herein, the inventive techniques set forth in this disclosure are rooted in computer technologies that overcome existing problems in traditional security and authentication systems, including problems associated with authenticating users of electronic gaming platforms and securely facilitating participation of multiple participants in virtual contests offered via the electronic gaming platforms. The technologies described in this disclosure provide a technical solution for overcoming the aforementioned limitations (as well as other limitations) associated with known techniques, such as limitations in authenticating, verifying, or authorizing multiple virtual participants in a given virtual contest. In some examples, the security and authentication technologies described in this disclosure can be utilized to configure collaborative gaming applications in distinct functionality states in connection with authorizing or authenticating virtual participants in virtual multi-participant contests. Additionally, the collaborative gaming applications can be configured to transition between the functionality states based on determinations resulting from improved geolocation authentication techniques, and a crowdsourcing framework can be leveraged to allow authorized participants to access, join, or create multi-participant contests. This technology-based solution marks an improvement over existing capabilities and functionalities related to online gaming systems by enabling authentication of multiple virtual participants in a single virtual contest.

While certain examples in this disclosure describe how these technologies can be applied to virtual parlay contests or virtual teaser contests, it should be understood that the technologies described herein can be applied to any type of virtual combination contest. The same or similar techniques utilized to authenticate virtual participants in virtual parlay contests or virtual teaser contests can be applied to other types of virtual combination contests. Additionally, the same or similar techniques utilized to customize modes or formats for virtual parlay contests or virtual teaser contests can be applied to other types of virtual combination contests.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1B:
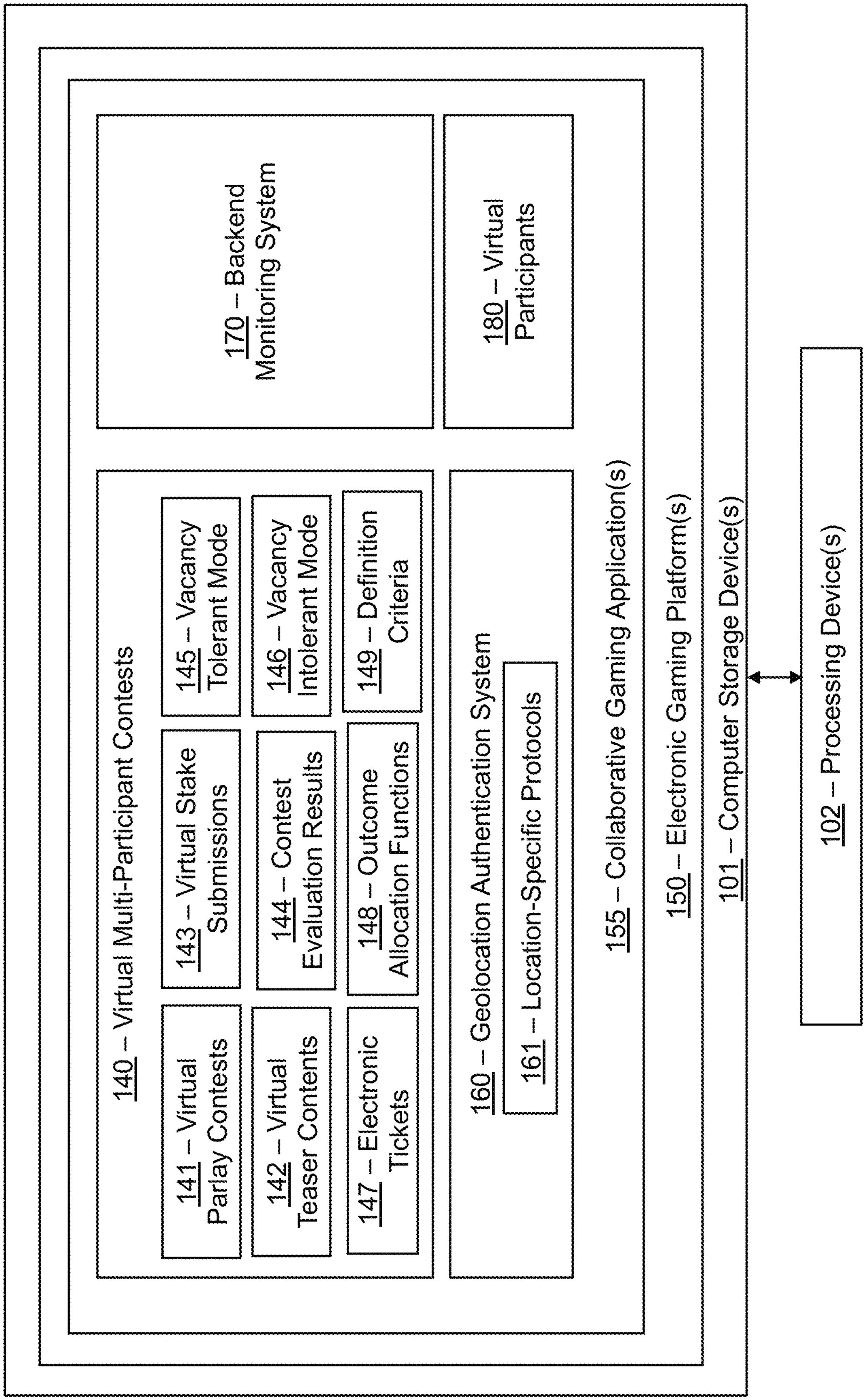
FIG. 1B is a block diagram illustrating exemplary features and functionalities of an electronic gaming platform in accordance with certain embodiments.

FIG. 1A is a block diagram of an exemplary system 100 in accordance with certain embodiments. FIG. 1B is a block diagram disclosing an exemplary configuration of an electronic gaming platform 150 in accordance with certain embodiments.

In certain embodiments, the system 100 comprises one or more electronic devices 110, one or more servers 120, and one or more electronic data providers 130 that are in communication over a network 105. An electronic gaming platform 150 is stored on, and executed by, the one or more servers 120. The network 105 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. The system 100 may include any number of electronic devices 110, servers 120, electronic data providers 130, and/or electronic gaming platforms 150.

All the components illustrated in FIG. 1A, including the electronic devices 110, servers 120, electronic data providers 130, and electronic gaming platforms 150, can be configured to communicate directly with each other and/or over the network 105 via wired or wireless communication links, or a combination of the two. Each of the electronic devices 110, servers 120, electronic data providers 130, and/or electronic gaming platforms 150 can also be equipped with one or more transceiver devices, one or more computer storage devices 101 (e.g., RAM, ROM, PROM, SRAM, etc.), and one or more processing devices 102 that are capable of executing computer program instructions.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more computer storage devices 101 can include (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the computer storage devices 101 can be physical, non-transitory mediums. The one or more computer storage devices 101 can store instructions configured to implement any or all functionalities of the electronic gaming platform 150 and/or collaborative gaming applications 155 described herein, and the instructions can be executed by one or more processor devices 102.

In certain embodiments, the electronic devices 110 may represent desktop computers, laptop computers, mobile devices (e.g., smart phones, personal digital assistants, tablet devices, vehicular computing devices, wearable devices, and/or any other device that is mobile in nature), and/or other types of devices. The one or more servers 120 may generally represent any type of computing device, including any of the electronic devices 110 mentioned above. In certain embodiments, the one or more servers 120 comprise one or more mainframe computing devices that execute web servers for communicating with the electronic devices 110, electronic data providers 130, and/or other applications and devices over the network 105 (e.g., over the Internet). Additionally, or alternatively, the one or more servers 120 may include one or more virtual servers and/or one or more cloud servers (i.e., that are executed in a cloud-computing environment).

The electronic data providers 130 can correspond to external or third-party platforms that are in communication with the electronic gaming platform 150 over the network 105. The electronic gaming platform 150 can communicate with the electronic data providers 130 to access various types of data. For example, in certain embodiments, the electronic gaming platform 150 can communicate with one or more electronic data providers 130 to access information related to sporting events and/or other types of events, e.g., such as times, dates, participating teams, locations, and/or other information associated with the events. Additionally, the electronic gaming platform 150 can communicate with one or more electronic data providers 130 to access information related to event odds, e.g., such as betting odds, point spreads, moneyline odds, over/under totals, and/or other related data. Further, in certain embodiments, the electronic gaming platform 150 can communicate with one or more electronic data providers 130 to access real-time video streams for live events (e.g., live sporting events, such as football games, horse races, baseball games, etc.), and provide virtual participants with access to the video streams.

In many cases, the electronic data providers 130 can provide an application programming interface (API) 131 that enables the data (e.g., event data, odds data, and/or live streaming data) to be accessed by the electronic gaming platform 150 over the network 105. The electronic gaming platform 150 can utilize the event and odds information to create, manage, and provide various types of virtual contests (e.g., including the virtual multi-participant contests 140 described herein). Additionally, the electronic gaming platform 150 can stream live sporting events to electronic devices 110 associated with the virtual participants 180 in various scenarios.

As discussed throughout this disclosure, the electronic gaming platform 150 can be configured to host, manage, and/or provide various types of virtual contests. Amongst other things, the electronic gaming platform 150 can provide virtual contests related to virtual sports betting, including individual sports betting contests and combination sports betting contests. In some embodiments, the electronic gaming platform 150 also can provide virtual contests associated with casino games, card games, table games, fantasy sports, lottery, bingo games, keno games, etc. One or more collaborative gaming applications 155 enable virtual participants 180 to access, view, join, create, and/or interact with the virtual contests. As explained in further detail below, the geolocation authentication system 160 can be configured to ensure that only authorized and authenticated virtual participants 180 are able to access, view, join, create, and/or interact with the virtual contests, and the geolocation authentication system 160 can be configured with special functionalities and security protocols for authorizing virtual participants in virtual contests that allow multiple virtual participants 180 (e.g., such as the virtual multi-participant contests 140 described herein).

In some embodiments, the electronic gaming platform 150 provides a collaborative gaming application 155 that includes a back-end stored and executed on the one or more servers 120 and a front-end stored and executed by one or more electronic devices 110 operated by end-users. All functionalities of the electronic gaming platform 150 and/or collaborative gaming application 155 described herein can be executed by the front-end application, back-end application, or a combination of both. In some exemplary configurations, the back-end portion of the collaborative gaming application 155 can provide various functionalities associated with hosting, creating, monitoring, and/or managing the virtual contests, as well as functionalities that permit administrative users to manage user the online electronic gaming platform 150 and user accounts created thereon. The front-end portion of the collaborative gaming application 155 can provide a portal, along with various graphical user interfaces (GUIs), that enable end-users to create accounts and interact with virtual contests (e.g., create, join, edit, or view virtual contests). In some instances, the front end of the collaborative gaming application 155 can represent a local application installed on the electronic devices 110 (e.g., mobile devices, smart phones, etc.) operated by end-users and/or can represent a web application that is accessible via a web browser installed on the electronic devices 110. In either scenario, the front end of the collaborative gaming application 155 can enable end-users to interact with the electronic gaming platform 150 and access the functionalities of the electronic gaming platform 150.

When end-users initially access the electronic gaming platform 150, the end-users may establish user accounts. In some scenarios, a registration process can collect various information such as the legal name, sex, age, residence location, income level, occupation, username, and demographic information. In some embodiments, end-users also may upload photos corresponding to identification documents (e.g., driver's license, passports, etc.) and/or input identification document information. The electronic gaming platform 150 can utilize some or all of this information to verify and authenticate the identity and/or age of the end-users.

After the identity of an end-user is verified and/or a user account is established with the electronic gaming platform 150, the end-user can be registered as a virtual participant 180 with the electronic gaming platform 150. Each virtual participant 180 is associated with a particular end-user, and the user account associated with the virtual participant 180 can be customized with a username, avatar, password, and/or other information. Subject to further security and authentication protocols implemented by the geolocation authentication system 160, the virtual participant 180 (or corresponding end-user associated therewith) can create new virtual contests (e.g., virtual multi-participant contests 140) and/or can enter virtual stake submissions 143 into existing virtual contests hosted on the electronic gaming platform 150. In some cases, the virtual stake submissions 143 can comprise data identifying an event (e.g., a live sporting event), a date and time associated with the event, a wager amount or bet associated with event, and/or a prediction for an event-related outcome (e.g., a moneyline, point spread, or over/under option identify an event-related or sports-related outcome).

As mentioned above, the electronic gaming platform 150 can host a wide variety of virtual contests. At least a portion of the virtual contests offered by the electronic gaming platform 150 can include virtual multi-participant contests 140. Each virtual multi-participant contest 140 can correspond to a combination contest that is comprised of a plurality of individual contests (e.g., identified by multiple individual virtual stake submissions 143 and corresponding wagers or bets). The outcome of a given virtual multi-participant contest 140 can be tied to the virtual stake submissions 143 that identify or select outcomes of the individual contests. For example, in some cases, the outcome of the virtual multi-participant contest 140 may be determined to be a winner in the scenario where the virtual stake submissions 143 accurately predict the outcomes of all individual contests included in the virtual multi-participant contest 140. Conversely, the outcome of the virtual multi-participant contest 140 may be determined to be a loser in the scenario where at least one virtual stake submission 143 does not accurately predict an outcome for one of the individual contests. In many embodiments, the virtual multi-participant contests 140 can be comprised of multiple virtual stake submissions 143 identifying separate predictions for sporting events (or occurrences of particular scenarios in the events, such individual player statistics, coin flip outcomes, etc.).

In some examples, the virtual multi-participant contests 140 can include virtual parlay contests 141. A virtual parlay contest 141 (which also can be referred to as a virtual accumulator or combo contest) corresponds to a contest that combines multiple virtual stake submissions 143, each identifying or predicting an outcome of related to a sporting event (or other type of live event). Any number of virtual stake submissions 143 can be associated with a virtual parlay contest 141. In some examples, a virtual parlay contest 141 can include two, four, eight, ten, sixteen, or eighteen separate virtual stake submissions 143. Each virtual stake submission 143 can include a separate bet, wager, or prediction for a game, team, or event outcome, and the virtual stake submissions 143 in a given virtual multi-participant contest 140 can encompass various betting formats, such as moneyline, point spread, and over/under.

The appeal of a virtual parlay contest 141 lies in its potential for significantly higher payouts compared to placing individual bets separately. In many cases, to win a virtual parlay contest 141, all the selections included within parlay contest must be correct. If any one of the bets loses, the entire parlay is lost. While offering the allure of higher rewards, traditionally parlay contests carry a greater risk due to the requirement of every selection being accurate to prevail on the parlay contest.

To illustrate by way of example, consider a virtual parlay contest 141 that is created to permit entries of four virtual stake submissions 143: 1) a first virtual stake submission 143 predicting or specifying a point spread outcome on a first football game; 2) a second virtual stake submission 143 predicting or specifying a point spread outcome on a first baseball game; 3) a third virtual stake submission 143 predicting or specifying a moneyline outcome on a second football game; and 4) a fourth virtual stake submission 143 predicting or specifying an over/under outcome a third football game. To win this exemplary virtual parlay contest 141, all four virtual stake submissions 143 must correctly predict the outcome of the corresponding sporting event. Conversely, if one or more of virtual stake submissions 143 do not correctly predict the outcome of a corresponding sporting event, the virtual parlay contest 141 fails and is determined to be a loser.

The electronic gaming platform 150 also can host virtual teaser contests 142. The virtual teaser contest 142 are similar to the virtual parlay contests 142 in the sense that each virtual teaser contest 142 is comprised of multiple virtual stake submissions 143, each identifying or predicting an outcome of a sporting event or aspect of a sporting event. However, unlike virtual parlay contests 142, the virtual participants 180 have the ability to adjust the odds (e.g., points information, total points, etc.), and/or select game options having pre-adjusted odds, of each individual contest included in a given virtual teaser contest 142. In exchange for receiving more favorable odds, winnings on virtual teaser contests 142 are typically lower than parlay contests.

In some scenarios, a virtual multi-player contest 140 may end or terminate after all live events (e.g., sporting events) identified in individual contests have ended. In other scenarios, a virtual multi-player contest 140 may end or terminate after a virtual stake submission 143 for an individual contest within the virtual multi-player contest 140 fails or loses (or does not accurately predict an outcome associated with the live event). The electronic gaming platform 150 can generate contest evaluation results 144 upon completion of each virtual multi-player contest 140. In winning scenarios, the contest evaluation results 144 can include results of the live contests and/or information for allocating winnings among virtual participants 180 who participated in the virtual multi-player contest 140. In losing scenarios, the contest evaluation results 144 can include results of the live contests and/or information for allocating losses among virtual participants 180 who participated in the virtual multi-player contest 140.

Traditional gaming operators only permit a single virtual participant 180 to select the bets or submissions included in a parlay or teaser contest and, the single virtual participant 180 takes on the entire the risk associated with the contest. This traditional technique for providing parlay or teaser contests lacks collaboratively and does not allow multiple virtual participants (e.g., who may include friends or family members in some cases) to collaborate in a single parlay contest.

As described in further detail below, the electronic gaming platform 150 can host various types of virtual multi-participant contests 140 in a variety of unique formats or configurations, and multiple virtual participants 180 can enter virtual stake submissions 143 into each of the virtual multi-participant contests 141. The functionality and format of each virtual multi-participant contest 140 is designed to encourage collaboration amongst multiple virtual participants 180 and, in some cases, can enable the virtual participants 180 to jointly enter virtual contests with friends, family members, and/or other individuals. Additionally, in some configurations, the functionality and format of the virtual multi-participant contests 140 may permit the risk associated with the contest to be spread across multiple virtual participants 180. As explained in further detail below, the virtual multi-participant contests 140 can be configured in different formats and can apply different outcome allocation functions 148 that vary how losses and/or winnings are allocated among virtual participants 180 in the virtual multi-participant contests 140.

The geolocation authentication system 160 of the electronic gaming platform 150 can be configured to verify, authenticate, validate, and/or authorize each virtual participant 180 who desires to participate in a virtual multi-participant contest 140 prior to accepting virtual stake submissions 143 from the virtual participants 180. The technological framework employed by the geolocation authentication system 160 permits multiple virtual participants 180 to participate in a single virtual contest while ensuring all corresponding security and authentication protocols are satisfied.

As explained above, implementing appropriate security or authentication protocols to enable collaboration among multiple virtual participants 180 in a single contest is technically challenging. Each participant desiring to participate in multi-participant combination contests can be located in various geographical regions (e.g., cities, states, or countries), some of which permit online gaming and some which prohibit online gaming. Additionally, while certain geographic regions permit online gaming, each geographic region has location-specific authentication criteria that should be satisfied to comply with local regulatory frameworks, and the location-specific authentication criteria can vary from region to region. For example, certain geographic regions have location-specific authentication criteria that can vary based on location requirements of participants when they engage in activities for depositing funds, placing virtual stake submissions 143, accepting payouts, and/or withdrawing funds. Additionally, some states in the United States may permit online gaming within certain locations of the state, but may bar online gaming at other locations within the state (e.g., users may be prohibited from engaging in online gaming when located at brick-and-mortar casino establishments or other locations in the state). The location-specific authentication criteria for each region also can vary based on many other types of verification and authentication requirements as well (e.g., based on permissible age requirements for participants, responsible gaming requirements, fair gaming requirements, etc.).

Further complexities can be attributed to the ever-evolving regulatory frameworks across geographic regions. In the US (and other countries), the location-specific authentication criteria is constantly evolving. For example, more and more states are permitting online gaming, each having their own location-specific authentication criteria, and the regulatory frameworks for the states are updated continuously. Moreover, various interstate agreements have been established in recent years which can impact the security or authentication measures necessitated by online gaming platforms. These dynamic changes are expected to continuously evolve over time, and the security or authentication systems utilized by online gaming platforms must keep pace with changes.

As described throughout this disclosure, the electronic gaming platform 150 can include a geolocation authentication system 160 that provides an adaptive technological framework for addressing the aforementioned technical challenges or other related challenges. Amongst other things, the electronic gaming platform 150 can be configured with functionality that accounts for the complex, heterogenous authentication requirements across multiple geographic regions, thereby permitting multiple virtual participants 180 to jointly collaborate in virtual contests even if the virtual participants 180 are situated in separate geographic regions having different location-specific authentication criteria. In many embodiments, the geolocation authentication system 160 can enable virtual contests to be hosted in a region-agnostic or state-agnostic fashion, allowing participation of virtual participants 180 from different states or regions. Additionally, in many embodiments, the technological framework of the electronic gaming platform 150 can be designed to be adaptive to account for changes in location-specific authentication criteria for each of the geographic regions and/or to accommodate additional location-specific authentication criteria for new geographic regions that allow online gaming in the future.

In certain embodiments, the aforementioned benefits can be provided using a combination of various technologies and techniques described below. Amongst other things, the geolocation authentication system 160 can store location-specific protocols 161 for each of a plurality of geographic regions (e.g., which may correspond to states in some cases). Each set of location-specific protocols 161 can be associated with a particular geographic region. The location-specific protocols 161 for each geographic region can define the current set of location-specific authentication criteria for the region and/or can include software code for executing any functionalities associated with ensuring compliance with the same. Additionally, the location-specific protocols 161 can be updated to account for changes in location-specific authentication criteria for any given region, and new location-specific protocols 161 can be added as more geographic regions permit online gaming.

Prior to authorizing a virtual participant 180 to enter a virtual stake submission 143 in a virtual contest hosted by the electronic gaming platform 150, the geolocation authentication system 160 may initially identify a location of an electronic device 110 being utilized by the virtual participant 180. The geolocation authentication system 160 can then retrieve location-specific protocols 161 associated with a geographic region where the participant is located, and execute the location-specific protocols 161 to determine whether or not the virtual participant is an authorized participant or unauthorized participant. As explained in further detail below, this determination can be used to transition the participant's collaborative gaming application 155 between an unrestricted functionality state (or authorized state) and a restricted functionality state (or unauthorized state).

The geolocation authentication system 160 can utilize various techniques, or a combination of techniques, to determine locations of virtual participants 180 or electronic devices 110 operated by the virtual participants 180. In some scenarios, the electronic devices 110 utilized by the virtual participants 180 can include global positioning system (GPS) functionality and the geolocation authentication system 160 can determine the location of the electronic devices 110 by retrieving GPS coordinates from the electronic devices 110. Additionally, or alternatively, the geolocation authentication system 160 can utilize Internet Protocol (IP) geolocation techniques to determine the locations of the electronic devices 110 based on their IP addresses. Additionally, or alternatively, the geolocation authentication system 160 can utilize Wi-Fi access point triangulation techniques to determine the locations of the electronic devices 110 based on locations of Wi-Fi access points that are in communication with the electronic devices 110. The geolocation authentication system 160 also can utilize other techniques to determine the locations the virtual participants 180.

In some examples, the electronic devices 110 operated by end-users store the collaborative gaming application 155 (or at least a front-end of the collaborative gaming application 155). When the collaborative gaming application 155 is launched or executed on an electronic device 110, the collaborative gaming application 155 causes the electronic device 110 to determine its GPS coordinates. In some scenarios, the electronic device 110 can include a GPS receiver that is configured to continuously receive signals broadcast from a network of satellites in orbit around the Earth, and the GPS receiver (or other component of the electronic device 110) calculates a precision location of the electronic device 110 using triangulation techniques and/or other techniques. In turn, the GPS coordinates obtained by the GPS receiver can be accessed by the collaborative gaming application 155, and the electronic device 110 can transmit signals over the network 105 to the one or more servers 120 hosting the electronic gaming platform 150 to notify the electronic gaming platform 150 of an individual's or end-user's current location.

Regardless of how locations are determined, the geolocation authentication system 160 can utilize the obtained locations to identify applicable location-specific protocols 161 corresponding to the locations of the virtual participants 180 and execute functions to ensure all location-specific protocols 161 are satisfied. For each virtual participant, this can include some or all of the following: a) determining whether or not the location of the virtual participant is within a geographic region that permits online gaming or online sports betting; b) if the virtual participant is within an permitted geographic region, determining if the geographic region includes one or more zones where online gaming is not permitted and, if so, whether the location is within one or more of the zones; c) determining age requirements for a corresponding geographic region and comparing the virtual participant's age with the same; d) identifying requirements relating to making deposits and/or placing virtual stake submissions 143 with wager amounts in the geographic region where the virtual participant is currently located and, if needed, limiting or adapting functionalities of the collaborative gaming application 155 to comply with such requirements; e) identifying requirements relating to allocating winnings and/or withdrawing funds in the geographic region where the virtual participant is currently located and, if needed, limiting or adapting functionalities of the collaborative gaming application 155 to comply with such requirements; f) determining accounting or tax-related criteria that apply to the current location of the virtual participant 180; and/or g) applying the accounting or tax-related criteria to accounting systems utilized by the electronic gaming platform 150 and/or activities of the virtual participant 180 (e.g., with respect to receiving winnings and/or withdrawing funds). The geolocation authentication system 160 can execute many other functions related to ensuring that the location-specific protocols 161 corresponding to virtual participant's location are satisfied.

The geolocation authentication system 160 can determine whether a virtual participant 180 is an authorized user (e.g., who is able to create virtual contests and/or enter virtual stake submissions 143 into virtual contests) or an unauthorized user (e.g., who is unable to create virtual contests and/or enter virtual stake submissions 143 in virtual contests) based on whether the location-specific protocols 161 are satisfied. If all applicable location-specific protocols 161 are satisfied, the virtual participant can be designated as an authorized user and can access all functionalities associated with the collaborative gaming application 155. Conversely, if one or more of the location-specific protocols 161 are not satisfied, the virtual participant 180 may be designated an unauthorized user and may be restricted from accessing certain functionalities of the collaborative gaming application 155.

In certain embodiments, the collaborative gaming application 155 utilized or accessed by a given virtual participant 180 can transition between different states based on whether or the virtual participant 180 is determined to be an authorized user or an unauthorized user. For example, in some embodiments, if the virtual participant 180 is determined to be an unauthorized user (or has not yet been authenticated as an authorized user), the collaborative gaming application 155 can be configured in a restricted functionality state 151 that prevents the virtual participant from accessing certain functionalities. On the other hand, if the virtual participant 180 is determined to be an authorized user, the collaborative gaming application 155 can be configured in an unrestricted functionality state 152 which permits the virtual participant 180 to access all functionalities associated with the collaborative gaming application 155.

In some embodiments, when the collaborative gaming application 155 is configured in the restricted functionality state 151, the virtual participant 180 can be prevented from accessing or executing one or more of the following functionalities: 1) entering virtual stake submissions 143 into virtual multi-participant contests 140 (e.g., virtual parlay contests 141, virtual teaser contests 142, etc.) or other virtual contests; 2) accessing or viewing available virtual multi-participant contests 140; 3) creating or initiating new virtual multi-participant contests 140 or other virtual contests; 4) depositing funds into the virtual participant's user account; 5) receiving payouts from winnings on virtual contests; and/or 6) withdrawing funds from the virtual participant's user account. In the unrestricted functionality state 152, the virtual participant 180 can access or execute any of the aforementioned functions.

Figure 2A:
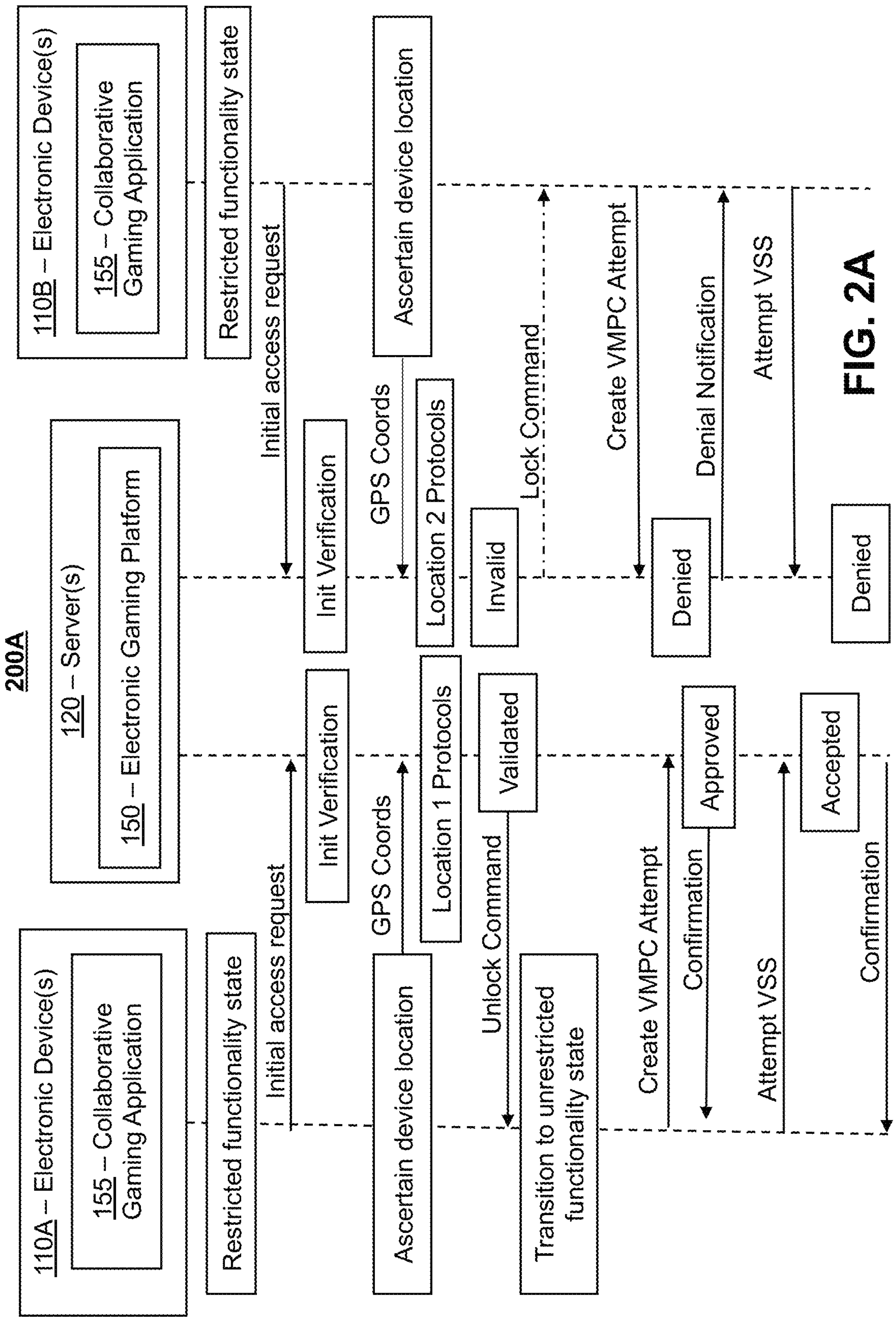
FIG. 2A is a diagram illustrating exemplary process flows for authenticating end-users in accordance with certain embodiments.

FIG. 2A is a diagram illustrating an exemplary process flows 200A that may be executed by the geolocation authentication system 160, collaborative gaming application 155, and/or electronic gaming platform 150. The left side of FIG. 2A illustrates a first process flow for a virtual participant 180 using a first electronic device 110A that is determined to be an authorized user. The right side of FIG. 2A illustrates a second process flow for a virtual participant 180 using a second electronic device 110B that is determined to be an unauthorized user. All communications between the server 120 hosting the electronic gaming platform 150 and the first and second electronic devices 110A-B can be conducted over a network 105, such as one that includes the Internet.

In the first process flow, the first electronic device 110A, which is operated by a first virtual participant 180, executes or accesses the collaborative gaming application 155. In some cases, the collaborative gaming application 155 can represent an application installed locally on the first electronic device 110A which serves as a front-end to communicate with the electronic gaming platform 150 located on one or more servers 120. Additionally, or alternatively, the collaborative gaming application 155 can be a web application stored on the server 120 that is accessed by a web browser installed on the first electronic device 110A.

The collaborative gaming application 155 may initially be configured in a restricted functionality state 151. In some embodiments, the restricted functionality state 151 may be a default state for the collaborative gaming application 155.

Upon opening or accessing the collaborative gaming application 155 (or initiating a new session with the server 120), the collaborative gaming application 155 may transmit an initial access request to the server 120 hosting the electronic gaming platform 150. This initial access request may notify the server 120 that the collaborative gaming application 155 is attempting to access the electronic gaming platform 150.

Upon receiving the initial access request, the electronic gaming platform 150 may preliminarily authenticate or confirm one or more initial verification criteria. For example, this may include confirming whether the first virtual participant 180 has already established a user account with the electronic gaming platform 150 in one or more approved geographic regions and/or authenticated the virtual participant's identity and/or age with the electronic gaming platform 150.

Next, a current location of the first electronic device 110A is ascertained by the electronic gaming platform 150 using any of the techniques described within this disclosure. In some embodiments, the first electronic device 110A may obtain and transmit its GPS coordinates to the server 120 hosting the electronic gaming platform 150 to identify its current location. Upon receiving the location of the first electronic device 110A, the electronic gaming platform 150 (e.g., the geolocation authentication system 160) can retrieve location-specific protocols 161 that apply to the participant's current location and determine whether or not the virtual participant 180 is an authorized user.

The current location of first electronic device 110A is utilized to retrieve location-specific protocols 161 (e.g., location 1 protocols) corresponding to a geographic region where the first electronic device 110A is located. The geolocation authentication system 160 utilizes the protocols to execute one or more additional authentication or validation checks (e.g., to determine if the end-user is situated in approved zones within the region, determine age requirements in the regions, determine criteria for placing virtual stake submissions 143, etc.).

In the example of the first process flow, the virtual participant 180 is validated as an authorized user, and the electronic gaming platform 150 (e.g., the geolocation authentication system 160) transmits an unlock command to the first electronic device 110A. In some cases, the unlock command can include a data transmission, notification, or electronic message that confirms the virtual participant 180 is an authorized user and/or is in compliance with all applicable location specific protocols 161. Upon receiving the unlock command, the collaborative gaming application 155 is transitioned to an unrestricted functionality state, which permits the virtual participant 180 to access various functionalities of the collaborative gaming application 155.

In this example, the collaborative gaming application 155 configured in the unrestricted functionality state 152 transmits a request attempting to create a new virtual multi-participant contest 140, and the electronic gaming platform 150 approves the request and sends a confirmation message to the first electronic device 110A. The newly created virtual multi-participant contest 140 is thereafter hosted on the virtual multi-participant contest 140 until its completion.

Further, the collaborative gaming application 155 configured in the unrestricted functionality state 152 transmits a second request attempting to place a virtual stake submission 143 in one more virtual multi-participant contests 140 (e.g., the virtual multi-participant contest 140 created by the virtual participant 180 and/or other virtual multi-participant contests 140 hosted by the electronic gaming platform 150). Again, the electronic gaming platform 150 approves the request and sends a confirmation message to the first electronic device 110A.

In the second process flow, the second electronic device 110B, which is operated by a second virtual participant 180, executes or accesses the collaborative gaming application 155. The collaborative gaming application 155 is initially configured in a restricted functionality state 151, which may be a default state for the collaborative gaming application 155. In the restricted functionality state, the collaborative gaming application 155 prohibits the second virtual participant 180 from accessing or executing certain functions.

The collaborative gaming application 155 transmits an initial access request to the server 120 hosting the electronic gaming platform 150, which can notify the server 120 that the collaborative gaming application 155 is attempting to access the electronic gaming platform 150. As mentioned above, upon receiving the initial access request, the electronic gaming platform 150 may preliminarily authenticate one or more initial verification criteria (e.g., such as confirming whether the first virtual participant 180 has established a user account with the electronic gaming platform 150 in one or more approved geographic regions and/or associated identity authentication information with the user account).

The current location of the second electronic device 110B is determined using any of the techniques described within this disclosure, and the second electronic device 110A transmits its location (e.g., GPS coordinates) to the server 120 hosting the electronic gaming platform 150. Upon receiving the location of the second electronic device 110B, the electronic gaming platform 150 (e.g., the geolocation authentication system 160) may retrieve location-specific protocols 161 (e.g., location 2 protocols) that apply to the participant's current location, and determine whether or not the virtual participant 180 is an authorized user.

In the example of the second process flow, the virtual participant 180 is not validated as an authorized user (or is determined to be an unauthorized user), and the collaborative gaming application 155 is not transitioned to an unrestricted functionality state 152. In some embodiments, the electronic gaming platform 150 (e.g., the geolocation authentication system 160) can optionally transmit a lock command to the second electronic device 110B that causes the collaborative gaming application 155 to remain in the restricted functionality state 151 (or, if not already in such state, which transitions the collaborative gaming application 155 to the restricted functionality state 151). In some cases, the lock command can include a data transmission, notification, or electronic message that confirms the virtual participant 180 is an unauthorized user and/or lacks compliance with one or more applicable location specific protocols 161.

In this example, the collaborative gaming application 155 configured in the restricted functionality state 151 transmits a request attempting to create a new virtual multi-participant contest 140, and the electronic gaming platform 150 denies the request and sends a denial message to the second electronic device 110B.

Similarly, the collaborative gaming application 155 configured in the restricted functionality state 151 transmits a second request attempting to place a virtual stake submission 143 in one of the virtual multi-participant contests 140. Again, the electronic gaming platform 150 denies the request and sends a denial message to the second electronic device 110B.

Returning to FIGS. 1A-1B, virtual participants 180 authorized by the geolocation authentication system 160 are permitted to access various functions associated with creating virtual multi-participant contests 140, entering virtual stake submissions 143 into virtual multi-participant contests 140, depositing funds into user accounts, and/or withdrawing funds from user accounts. Amongst other things, the virtual participants 180 can create new virtual parlay contests 141 and virtual teaser contests 142 in a variety of formats or configurations.

In some examples, a virtual participant 180 creating a new virtual multi-participant contest 140 can access one or more GUIs on the electronic gaming platform 150 to customize definition criteria 149 the contest based on some or all the following options:

(a) Virtual Game Type: The virtual participant 180 can select from a plurality of game type options including, but not limited to, options for creating a multi-participant virtual parlay contest 141, a multi-participant virtual teaser contest 142, and/or other types of virtual multi-participant contests 140.

(b) Contest Quantity Options: The virtual participant 180 can select the number of games or individual contests to be included in the virtual multi-participant contest 140. Each virtual multi-participant contest 140 can include two or more individual contests (e.g., 2-8 individual contests, 2-25 individual contests, or 2-50 individual contests).

(c) Vacancy Tolerance Options: As explained in further detail below, the virtual participant 180 can select an option to specify whether the virtual multi-participant contest 140 is to be provided in a vacancy tolerant mode 145 or vacancy intolerant mode 146. In the vacancy tolerant mode 145, each individual virtual stake submission 143 is locked upon entry in a contest, and the contest proceeds even if there are vacancies (or unfilled games) on a ticket for the virtual multi-participant contest 140 prior to the start of a live event identified by the ticket. For example, if only three virtual stake submissions 143 are received for a four-game virtual parlay contest, the virtual multi-participant contest 140 remains an active contest even if one or more live events (e.g., live sporting events) identified by the received virtual stake submissions 143 have occurred or are occurring. Conversely, in the vacancy intolerant mode 146, the virtual multi-participant contest 140 may be cancelled if virtual stake submissions 143 are not received for all individuals contests prior to a start time of a live event identified by a virtual stake submission 143 entered into the virtual multi-participant contest 140. Further details of the vacancy tolerance options are described below.

(d) Public and Private Format Options: The virtual participant 180 also can specify whether the virtual multi-participant contest 140 is to be provided in a public format or private format. In a public format, the virtual multi-participant contest 140 can be joined by any virtual participant 180 determined to be an authorized user of the electronic gaming platform 150. In some embodiments, the electronic gaming platform 150 can provide access to one or more GUIs that allow virtual participants to view a listing of virtual multi-participant contests 140, and the virtual participants 180 can enter virtual stake submissions 143 into desired contests. In a private format, the virtual multi-participant contest 140 can only be joined by a limited number of virtual participants 180. In some embodiments, the creator of the virtual multi-participant contest 140 (and virtual participants 180 already invited to the virtual multi-participant contest 140) can transmit invitations to specific virtual participants 180 to enable entry of virtual stake submissions 143 into the virtual multi-participant contest 140 by those specific virtual participants 180.

(e) Entry Rules: The virtual participant 180 also can specify one or more entry rules that must be satisfied for virtual participants 180 and/or virtual stake submissions 143 to be entered into the virtual multi-participant contest 140. In one example, an entry rule may restrict virtual stake submissions 143 for the virtual multi-participant contest 140 to one or more desired game types (e.g., baseball games, basketball games, tennis matches, etc.). In another example, an entry rule may specify a win rate that restricts virtual stake submissions 143 from being entered into the virtual multi-participant contest 140 by virtual participants 180 whose win percentage on previous virtual stake submissions 143 falls below the specified win rate. In a further example, an entry rule may specify an odds range that identifies an upper odds bound and/or a lower odds bound and which restricts virtual stake submissions 143 from being entered into the virtual multi-participant contest 140 if the virtual stake submissions 143 fall outside the specified odds range. Many other types of entry rules also may be defined for the virtual multi-participant contest 140.

The definition criteria 149 for a virtual multi-participant contest 140 also can be customized based on other types of settings not specifically mentioned above. For example, in some embodiments, the creator can specify how many virtual stake submissions 143 can be entered into a virtual contest by each virtual participant 180. In some configurations, the contest criteria may limit each virtual participant 180 to entering a single virtual stake submission 143 into a contest. In other configurations, the contest criteria may permit a virtual participant 180 to enter any number of virtual stake submissions 143 into the contest. In certain embodiments, the creator also may select options that specify how winnings or losses are to be all allocated among virtual participants 180 who join the virtual multi-participant contest 140. As described in further detail below, various outcome allocation functions 148 can be utilized to allocate winnings or losses among the virtual participants 180 using different techniques.

In certain embodiments, some or all of the definition criteria 149 used to define the virtual multi-participant contests 140 can be built into the format of the virtual multi-participant contests 140 by the electronic gaming platform 150 and, thus, may not be customizable by creators of the virtual multi-participant contests 140. In many embodiments, at least a portion of the definition criteria 149 is customizable by the creators of the virtual multi-participant contests 140.

After the criteria or settings for a virtual multi-participant contest 140 are specified, the electronic gaming platform 150 can create the virtual multi-participant contest 140, generate a unique identifier (ID) for the virtual multi-participant contest 140, assign the unique ID to the virtual multi-participant contest 140, and/or create an electronic ticket 147 corresponding to the virtual multi-participant contest 140. The newly created virtual multi-participant contest 140 can then be hosted on the electronic gaming platform 150 until its completion.

The electronic gaming platform 150 can manage all aspects of hosting the virtual multi-participant contest 140. For example, the electronic gaming platform 150 can be configured to monitor outcomes of individual contests associated with the virtual multi-participant contest 140 using real-time event data obtained via APIs 131 on one or more electronic data providers 130. The electronic gaming platform 150 also can be configured to receive and process virtual stake submissions 143 from virtual participants 180 consistent with the definition criteria 149 specified for the contest, such as the vacancy tolerance/intolerant mode for the contest, the public/private format for the contest, and/or entry rules for the contest. The electronic gaming platform 150 also can determine if the virtual multi-participant contest 140 wins or loses (e.g., based on analysis of real-time, or near-real time, data streams received from one or more electronic data providers 130), and can allocate payouts among virtual participants 180 for winning tickets or withdraw funds from user accounts to cover losses according to outcome allocation functions 148 associated with the contest.

In some cases, the electronic gaming platform 150 can generate an electronic ticket 147 corresponding to each virtual multi-participant contest 140 that is created. An electronic ticket 147 initially may be created for a virtual multi-participant contest 140 when a creator participant initiates a virtual multi-participant contest 140 and/or initially enters a virtual stake submission 143 for one of the individual contests included in the virtual multi-participant contest 140. The creator and/or other virtual participants 180 can then interact with the electronic ticket 147 to fill the remaining individual contests. Throughout the duration of the virtual multi-participant contest 140, virtual participants 180 can access the electronic ticket 147 to monitor the status of the virtual multi-participant contest 140 and/or individual contests associated with the virtual multi-participant contest 140.

Figure 3:
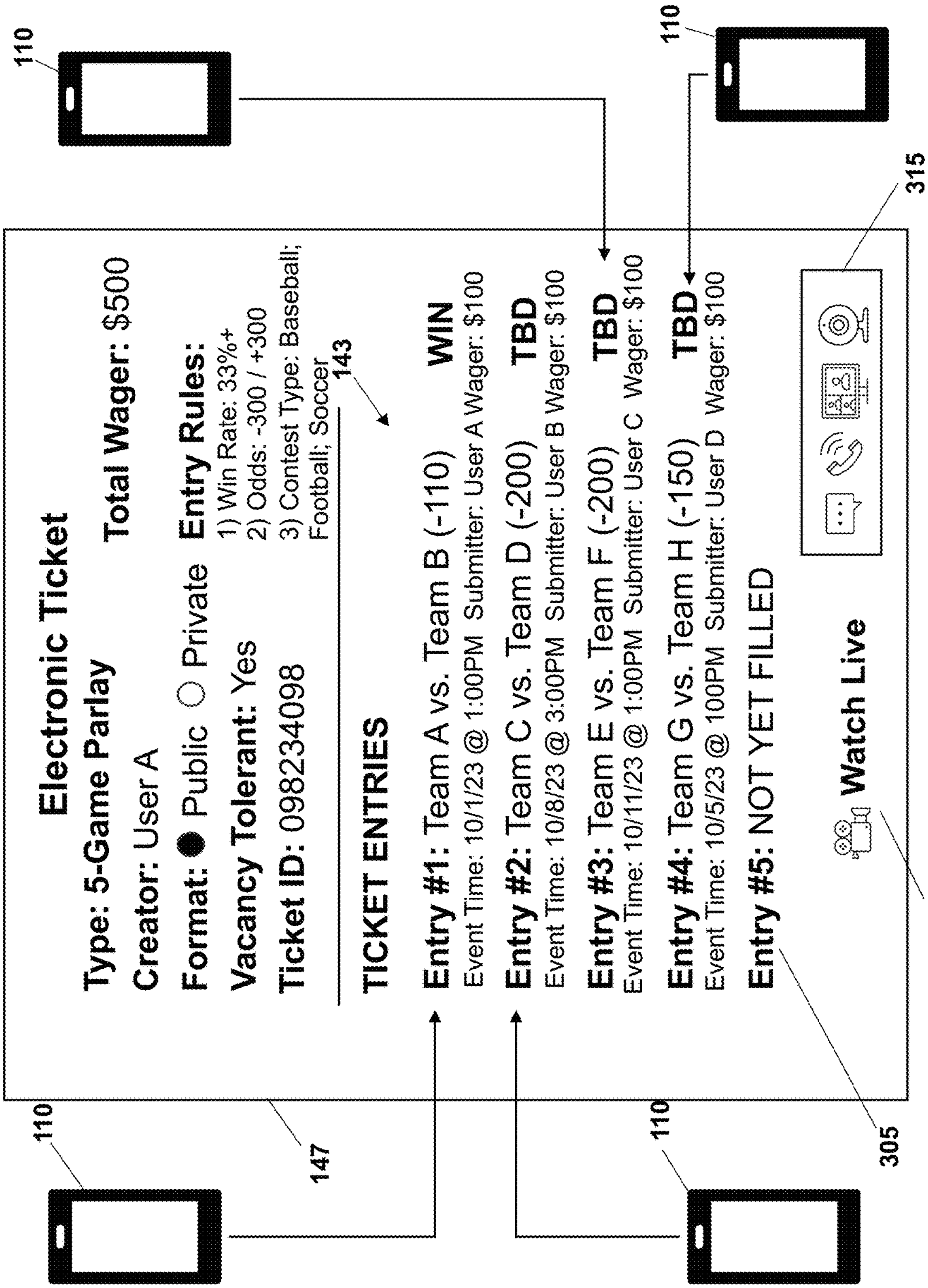
FIG. 3 is an illustration of an exemplary electronic ticket for a virtual multi-participant contest according to certain embodiments.

FIG. 3 illustrates an exemplary electronic ticket 147 for a virtual multi-participant contest 140 according to certain embodiments. The electronic ticket 147 may be displayed on GUIs presented on electronic devices 110 operated by virtual participants 180. The electronic ticket 147 permits the virtual participants to view the status of the virtual multi-participant contest 140 (and individual contests included therein) and provides various information about the structure or format of the virtual multi-participant contest 140. For virtual multi-participant contests 140 that are not filled, a virtual participant 180 can select any unfilled option to enter a virtual stake submission 143 into the electronic ticket 147.

A top section of the electronic ticket 147 includes contest details related to the virtual multi-participant contest 140. The contest details are defined, at least in part, using the criteria specified by a creator for the virtual multi-participant contest 140. A bottom section of the electronic ticket 147 comprises information related to the individual contests associated with the virtual multi-participant contest 140.

In this example, the contest details indicate that the virtual multi-participant contest 140 is a 5-game parlay contest that has been created by User A. The format of the contest is set to public, thus allowing any authorized virtual participant 180 on the electronic gaming platform 150 to submit virtual stake submissions 143 into the virtual multi-participant contest 140. The virtual multi-participant contest 140 also is set in a vacancy tolerant mode 145, thus allowing the electronic ticket 147 to remain active in situations where live event times associated with the virtual stake submissions arise before all individual contests for the virtual multi-participant contest 140 are filled. The total wager amount for this exemplary 5-game parlay contest is set to five hundred dollars. In some cases, the electronic ticket 147 also may specify the winning payout if the ticket prevails (e.g., a total amount and/or amount for each virtual participant 180). The electronic ticket 147, or corresponding virtual multi-participant contest 140, is assigned a unique ID and that is displayed on the electronic ticket 147.

Three entry rules have been specified for the virtual multi-participant contest 140. A first entry rule requires a virtual participant 180 to have a threshold win rate (e.g., thirty-three percent or higher in this example) to enter a virtual stake submission into the virtual multi-participant contest 140. A second entry rule limits the virtual stake submissions 143 to predictions or wagers within certain odds ranges (e.g., between −300 and +300 in this example). A third entry rule limits the virtual stake submissions 143 to particular game or contest types (e.g., basketball games, baseball games, and soccer matches in this example).

Further, in this example, four virtual stake submissions 143 have been entered into the 5-game parlay contest by four different virtual participants 180 (User A, User B, User C, and User D). Each of the four virtual participants 180 (or corresponding end-users) utilized a separate electronic device 110 to enter a corresponding virtual stake submission 143 into the contest. Individual contest details are displayed adjacent to each of the four virtual stake submissions 143 that have been entered into the contest (e.g., identifying a live sporting event, odds information, date/time of the live sporting event, a virtual participant 180 who submitted the virtual stake submission 143, an individual wager amount, and/or other relevant information). A column on the right side of the ticket shows the status of each virtual stake submission 143. The first individual contest (e.g., a football game involving Team A and Team B) submitted by User A has already occurred and is determined to be a winner by the electronic gaming platform 150. The other three individual contests have not yet occurred and, therefore, remain as TBD (to be determined) status.

A fifth contest opening or ticket slot corresponds to a ticket vacancy 305, which has not yet been filled by a virtual stake submission 143. Any authorized virtual participant 180 of the electronic gaming platform 150 can enter a virtual stake submission 143 to fill the fifth contest given that the 5-game parlay is being hosted in a public format. If the 5-game parlay was hosted in a private format, only virtual participants 180 who were invited to the contest can enter a virtual stake submission 143 to fill the ticket vacancy 305.

Additionally, because the 5-game parlay was created in a vacancy tolerant mode 145, the electronic ticket 147 remains active even though the live sporting event associated with the first individual contest has already occurred and was determined to be a winner. If the first individual contest had occurred and was determined to be a loser, the electronic gaming platform 150 may close the electronic ticket 147 and allocate losses for the electronic ticket among the virtual participants according to a predetermined loss allocation technique at the end of the contest. As explained below, various outcome allocation functions 148 can utilize different techniques to allocate losses among virtual participants 180 in scenarios where a multi-participant contest, or corresponding electronic ticket 147, is determined to be a loser. On the other hand, in the scenario where the fifth contest is filled at some point in time and all individual contests associated with the electronic ticket 147 are determined to be winners, the outcome allocation functions 148 can allocate winnings among the virtual participants using various win allocation techniques.

In certain embodiments, the electronic gaming platform 150 can include participant communication functions 315 which enable all virtual participants 180 of a given electronic ticket 147 to communicate with each other while the electronic ticket 147 is active or pending. The participant communication functions 315 can establish communications channels via the electronic platform 150 that enable the virtual participants 180 to communicate with each other via text, audio, video, instant messaging, and/or by other means. For example, the participant communication functions 315 may enable the virtual participants to write text messages to each via a chat feature accessible via the electronic ticket and/or may enable virtual participants to initiate video conferences and/or phone calls. In the example of FIG. 3, Users A-D entered virtual stake submissions 143 into the electronic ticket 147 and, therefore, can access the participant communication functions 315 to communicate with each other. In some scenarios, the communication functionalities can be beneficial because they enable the virtual participants 180 to collaborate in selecting game options or virtual stake submissions 143 to fill ticket vacancies 305. In other scenarios, the communication functionalities can be beneficial because they enable the virtual participants 180 to comment on ongoing games, root for teams or event outcomes, write encouraging comments to virtual participants 180, and/or collaborate in other ways.

Additionally, in certain embodiments, the electronic gaming platform 150 can provide virtual participants 180 with selective access to video streaming data in response to participating in virtual multi-participant contests 140 and/or electronic tickets 147. In some examples, a virtual participant 180 who has entered a virtual stake submission 143 into a virtual multi-participant contest 140 can be granted access rights, permissions, and/or authorization to access video streaming data for a live event associated with the virtual stake submission 143 and/or live events associated with other virtual stake submissions 143 entered into the same virtual multi-participant contest 140. In some embodiments, the virtual participants 180 are only granted authorization to access live events 175 that are identified by, or associated with, electronic tickets 147 for which they have submitted have stakes in, and they are prohibited from accessing streaming data for other live events that are not relevant to the virtual participant's electronic tickets 147. Selectively granting access to video streaming data in this manner enables the virtual participants 180 to watch the live events associated with their electronic tickets 147, and encourages the virtual participants 180 to enter virtual stake submissions into contests for live events they wish to view.

In the example of FIG. 3, the electronic ticket 147 includes a viewing or streaming option 310 that enables the virtual participants 180 currently associated with the electronic ticket 147 (Users A-D) to access streaming data pertaining to the four live events associated with the virtual stake submissions 143 entered into the contest. The virtual participants also may gain viewing privileges to an additional live event if the ticket vacancy 305 is filled with a virtual stake submission 143 identifying a new live event that is not already identified by the first four entries. While each live event is ongoing, the virtual participants 180 associated with the electronic ticket 147 can select the viewing or streaming option 310 to view corresponding events. In response to a virtual participant 180 selecting the viewing or streaming option 310 (and/or selecting a desired live event to view), one or more electronic data providers 130 may transmit real-time video streaming data to an electronic device 110 associated with the virtual participant to enable view of the desired event.

As explained throughout this disclosure, the electronic tickets 147 and/or virtual multi-participant contests 140 can be comprised of multiple individual contests. It should be understood that multiple individual contests can correspond to a single live event. For example, one individual contest may correspond to a spread outcome for a live event and a second individual contest may correspond to a total outcome (over/under) for the same live event. Along similar lines, in some cases, individual contests can be based are occurrences of particular conditions in a live event (e.g., whether a player scores a predetermined number of points, a coin flip outcome, a total number of points at halftime, etc.).

Returning to FIGS. 1A-1B, configuring virtual multi-participant contests in the vacancy tolerant mode 145 can be advantageous for several reasons. Amongst other things, permitting vacant contest openings to be filled after one or more live contests of an electronic ticket have occurred can be enticing to virtual participants 180 and increases the chances that the electronic ticket 147 will be a winner. This can serve to encourage virtual participants 180 to fill vacancies in contests because they already know that one or more of the individual contests in the multi-game contest is a winner.

Figure 2B:
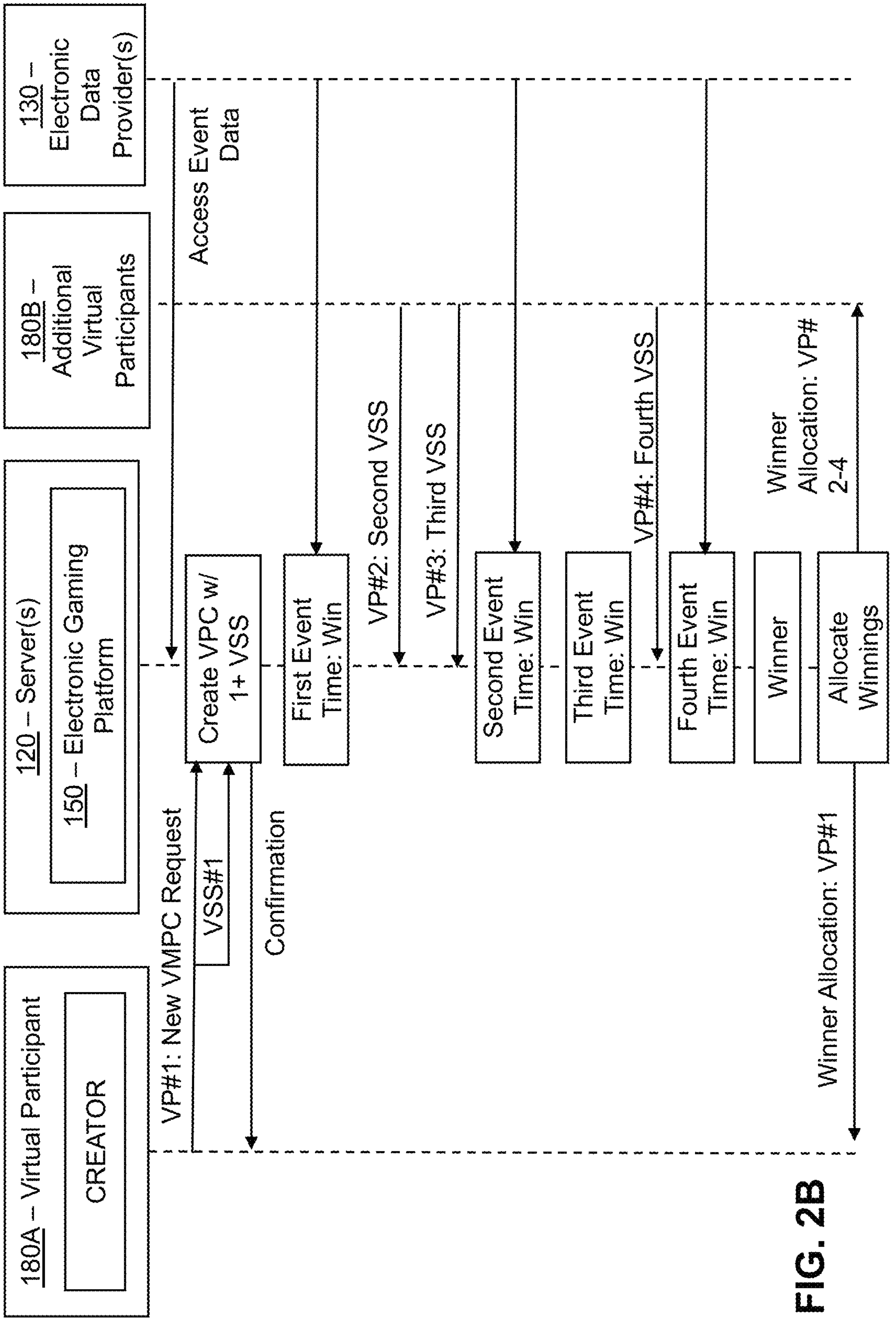
FIG. 2B is a diagram illustrating an exemplary process flow for processing a virtual multi-participant contest in accordance with certain embodiments.

FIG. 2B illustrates an exemplary process flow 200B for processing an electronic ticket for a virtual multi-participant contest 140 configured in a vacancy tolerant mode 145. This process flow 200B can be applied to process multi-participant virtual parlay contests 141, multi-participant virtual teaser contests 142, or the like. All communications between virtual participants 180, the electronic gaming platform 150, and electronic data providers 130 can be conducted over a network 105. Additionally, all virtual participants 180 mentioned in this example are assumed to be authorized users that have been authenticated by the electronic gaming platform 150 (e.g., the geolocation authentication system 160 of the electronic gaming platform 150). Furthermore, all virtual participants 180 that join a given virtual multi-participant contest 140 (or corresponding electronic ticket 147) have the ability to communicate with each other via the electronic gaming platform 150 (e.g., via chat, instant message, video conference, audio, etc.).

In the exemplary process flow 200B, the electronic gaming platform 150 accesses information relating to upcoming events (e.g., sporting events), as well as odds information relating to those events, from one or more electronic data providers 130. In some cases, this information can be retrieved by periodically or continuously polling APIs 131 associated with one or more electronic data providers 130. The electronic gaming platform 150 can utilize this information to generate a listing of betting or wagering options, each corresponding to a live event and each being associated with odds information (e.g., moneyline odds, point spread, over/under, etc.). Virtual participants can select desired options when entering virtual stake submissions 143 into a virtual multi-participant contest 140.

A first virtual participant 180A, who represents a contest creator, transmits a request to create a virtual multi-participant contest (VMPC). The request includes various content definition criteria 149 for defining the virtual multi-participant contest 140, including criteria that specifies a vacancy tolerant mode 145 for a virtual multi-participant contest 140 comprised of four games (e.g., a 4-game virtual parlay or 4-game virtual teaser contest). In some embodiments, the first virtual participant 180A may access a GUI associated with the electronic gaming platform 150 to define the criteria for the virtual multi-participant contest 140.

Upon receiving the request, the electronic gaming platform 150 may create an electronic ticket 147 for the virtual multi-participant contest 140 and assign a unique ID to the virtual multi-participant contest 140. In some embodiments, the electronic gaming platform 150 also may send a confirmation notification to the first virtual participant 180A (or electronic device 110 operated by the first virtual participant 180A) confirming that the virtual multi-participant contest 140 has been established.

In certain embodiments, the first virtual participant 180A may be required to enter at least one virtual stake submission (VSS) when the virtual multi-participant contest 140 is created. If desired, the first virtual participant 180A can enter multiple virtual stake submissions 143 into the contest. In this example, the first virtual participant 180A enters a single virtual stake submission 143 into the contest that is created. A live event associated with the virtual stake submission 143 occurs before the remaining three virtual stake submissions 143 are received. The electronic gaming platform 150 monitors the status and outcome of the live event based on event information obtained from one or more electronic data providers 130, and determines that the virtual stake submission 143 is a winner.

The electronic ticket 147 created for the virtual multi-participant contest 140 can be accessed and viewed by other authorized virtual participants 180B (e.g., all virtual participants or a subset of virtual participants based on a public/private setting for the contest). Joining the virtual multi-participant contest 140 created by the first virtual participant 180A becomes more appealing now that the first individual contest is already determined to be a winner.

In some cases, the electronic gaming platform 150 can provide a GUI that allows virtual participants to view and access virtual multi-participant contests 140 having one or more vacancies. Two additional virtual stake submissions 143 (VSS #2 and VSS #3) are then entered into the virtual multi-participant contest 140 by a second virtual participant (VP #2) and a third virtual participant (VP #3). The live events corresponding to both of these virtual stake submissions 143 occur before the last individual contest for the 4-game electronic ticket or VMPC is filled. The electronic gaming platform 150 monitors the status and outcome of these live events based on event information obtained from one or more electronic data providers 130, and determines that both of these virtual stake submissions 143 are winners. In some cases, one more data feeds or data streams can provide real-time or near real-time data corresponding to the live events.

Joining the virtual multi-participant contest 140 created by the first virtual participant 180A becomes even more appealing now that three of the four individual contests are determined to be winners. At a later point in time, a fourth virtual participant (VP #4) enters the final virtual stake submission (VSS #4). Again, the electronic gaming platform 150 monitors the status and outcome of the live event corresponding to the fourth virtual stake submission, and determines that this final virtual stake submission 143 also is winner.

Because all virtual stake submissions for the four individual contests were determined to be winners, the virtual multi-participant contest 140 (or corresponding electronic ticket) is designated as a winner and the electronic gaming platform 150 allocates winnings among the virtual participants 180 according to a predesignated outcome allocation function 148. In certain embodiments, this can include depositing funds into user accounts associated with the virtual participants according to a winning allocation technique. A variety of different winning allocation techniques can be utilized.

Figure 2C:
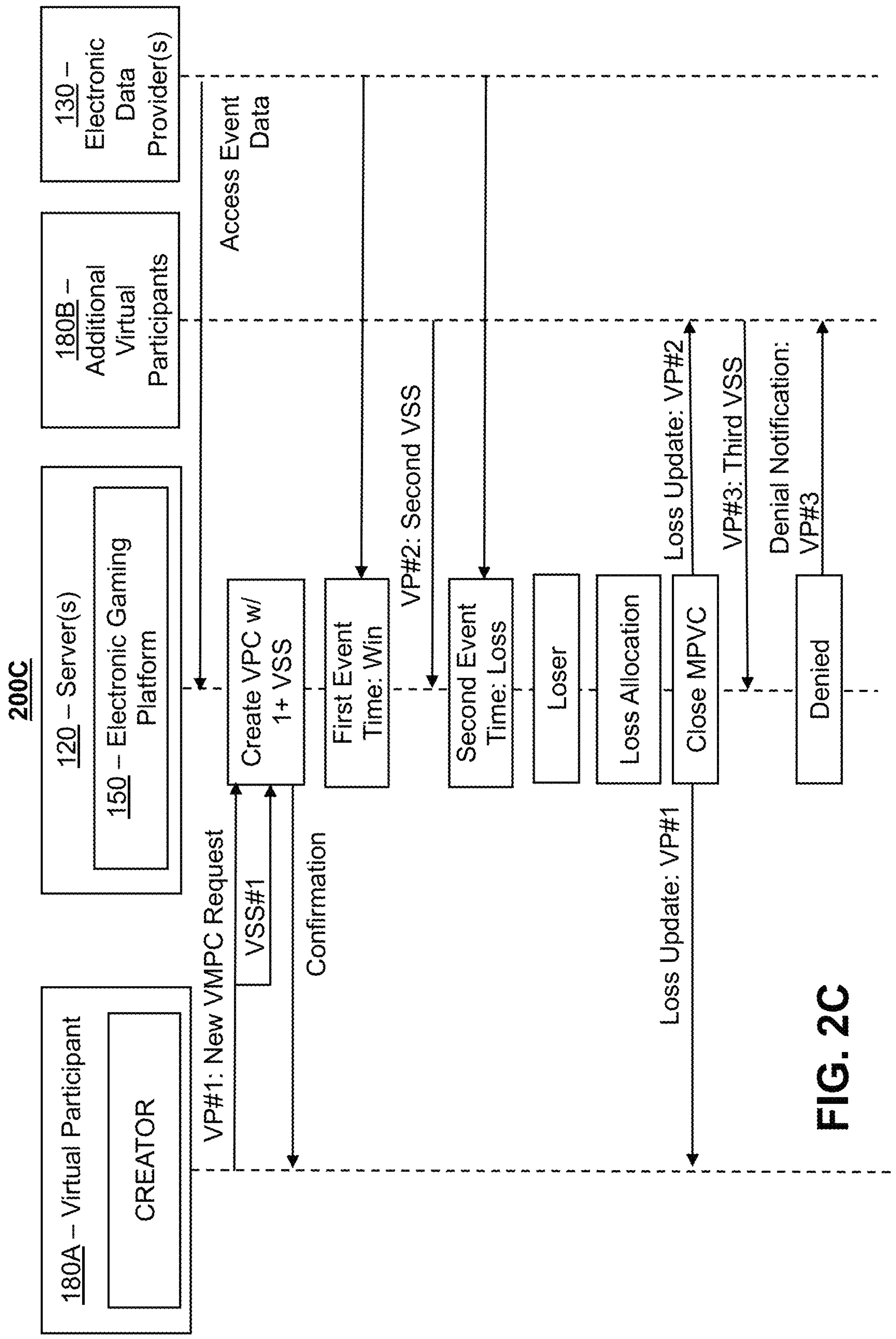
FIG. 2C is a diagram illustrating another exemplary process flow for processing a virtual multi-participant contest in accordance with certain embodiments.

FIG. 2C illustrates another exemplary process flow 200C for processing an electronic ticket for a virtual multi-participant contest 140 configured in a vacancy tolerant mode 145. This process flow 200C can be applied to process multi-participant virtual parlay contests 141, multi-participant virtual teaser contests 142, or the like. All communications between virtual participants 180, the electronic gaming platform 150, and electronic data providers 130 can be conducted over a network 105. Additionally, all virtual participants 180 mentioned in this example are assumed to be authorized users that have been authenticated by the electronic gaming platform 150 (e.g., the geolocation authentication system 160 of the electronic gaming platform 150).

In the exemplary process flow 200C, the electronic gaming platform 150 accesses information relating to upcoming events (e.g., sporting events), as well as odds information relating to those events, from one or more electronic data providers 130. As mentioned above, in some embodiments, this information can be retrieved by polling APIs 131 associated with the one or more electronic data providers 130, and the electronic gaming platform 150 can utilize this information to generate a listing of available betting or wagering options corresponding to live events, which can be selected when the virtual participants 180 input virtual stake submissions 143 into a virtual multi-participant contest 140.

A first virtual participant 180A serves as a contest creator and transmits a request to create a virtual multi-participant contest (VMPC). The request includes various content definition criteria 149 for defining the virtual multi-participant contest 140, including criteria that specifies a vacancy tolerant mode 145 for a virtual multi-participant contest 140 comprised of four games (e.g., a 4-game virtual parlay or virtual teaser contest). In some embodiments, the first virtual participant 180A may access a GUI associated with the electronic gaming platform 150 to define the criteria for the virtual multi-participant contest 140.

Upon receiving the request, the electronic gaming platform 150 may create an electronic ticket for the virtual multi-participant contest 140 and assign a unique ID to the virtual multi-participant contest 140. In some embodiments, the electronic gaming platform 150 also may send a confirmation notification to the first virtual participant 180A (or electronic device 110 operated by the first virtual participant 180A) confirming that the virtual multi-participant contest 140 has been established.

As mentioned above, the first virtual participant 180A may be required to enter at least one virtual stake submission (VSS) when the virtual multi-participant contest 140 is created. In this example, the first virtual participant 180A enters a single virtual stake submission 143 into the contest that is created. A live event associated with the virtual stake submission 143 occurs before the remaining three virtual stake submissions 143 are received. The electronic gaming platform 150 monitors the status and outcome of the live event based on event information obtained from one or more electronic data providers 130, and determines that the virtual stake submission 143 is a winner.

An electronic ticket created for the virtual multi-participant contest 140 can be accessed and viewed by other authorized virtual participants 180B (e.g., some or all virtual participants based on a public/private setting for the contest). In some cases, the electronic gaming platform 150 can provide a GUI that allows virtual participants to view and access virtual multi-participant contests 140 having one or more vacancies.

A second virtual stake submission (VSS #2) is then entered into the virtual multi-participant contest 140 by a second virtual participant (VP #2). The live event corresponding to the virtual stake submissions 143 occurs before the last two individual contests for the 4-game electronic ticket or VMPC are filled. The electronic gaming platform 150 monitors the status of the live event based on event information received from one or more electronic data providers 130, and determines that the second virtual stake submissions is a loser. In some cases, one more data feeds can provide real-time or near real-time data corresponding to the live events.

Upon determining that the second virtual stake submission 143 is a loser, the electronic gaming platform may designate the virtual multi-participant contest 140 (or corresponding electronic ticket 147) as a loser, close the virtual multi-participant contest 140, and/or send loss notifications to the first and second virtual participants. Losses associated with the virtual multi-participant contest 140 can be allocated among the virtual participants using different outcome allocation functions 148 and funds deposited into user accounts of the virtual participants can be transferred to the electronic gaming platform 150 to cover the losses.

Because the virtual multi-participant contest 140 is closed, no further virtual stake submissions 143 will be accepted by the electronic gaming platform 150. In this exemplary process flow 200C, a third virtual participant (VP #3) attempts to enter a virtual stake submission (VSS #3) after the contest is closed, and the electronic gaming platform 150 transmit a denial message to the third virtual participant denying entry of the virtual stake submission.

FIGS. 2B-2C illustrate two examples of processing virtual multi-participant contest 140 configured in a vacancy tolerant mode 145. As demonstrated above, electronic tickets 147 can remain open-ended or active in scenarios where a live event identified by a virtual stake submission 143 entered into the virtual multi-participant contest 140 has taken place (or is ongoing) and less than all individual contests associated with the electronic tickets 147 have been filled. This unique contest format can encourage participation among virtual participants and, in some scenarios, allow virtual participants to enter virtual stake submissions 143 into virtual multi-participant contests 140 that already have one or more wins for individual contests.

On the other hand, a virtual multi-participant contest 140 configured in a vacancy intolerant mode 146 may require all individual contests to be filled prior to an occurrence of a live event identified by at least one of virtual stake submission 143 included in the virtual multi-participant contest 140. The electronic gaming platform 150 may cancel an electronic ticket 147 for a virtual multi-participant contest 140 configured in a vacancy intolerant mode 146 if virtual stake submissions 143 have not been received for all individual contests prior to the start of a live event. In this scenario, the wagers or bets for any virtual stake submissions 143 can be returned to user accounts of virtual participants 180 who entered virtual stake submissions 143 into the virtual multi-participant contest 140 prior to its cancellation.

Returning to FIGS. 1A-1B, winnings and losses for virtual multi-participant contests 140 can be allocated using a variety of different outcome allocation functions 148. As mentioned above, a given virtual multi-participant contest 140 can be designated a winner in the scenario where all individual contests within the virtual multi-participant contest 140 are won. The winning amount can be divided among the virtual participants equally based on the number of virtual stake submissions 143 submitted by each participant into the virtual multi-participant contest 140.

In some examples, an outcome allocation function 148 can allocate winnings among virtual participants 180 of a virtual multi-participant contest 140 declared as a winner based, at least in part, on the number of virtual stake submissions 143 by each of the virtual participants. For instance, if a given virtual multi-participant contest 140 is comprised of ten individual contests and ten separate virtual participants 180 each entered a single virtual stake submission 143 into the contest, then each virtual participant would receive one-tenth of the winnings (e.g., which, in some cases, can be based on parlay or teaser odds). Consider another example in which a given virtual multi-participant contest 140 is comprised of four individual contests, and a first virtual participant entered three virtual stake submissions 143 into the contest while a second virtual participant entered a single virtual stake submission 143 into the contest. In the event of a winning electronic ticket 147, the first virtual participant 180 would receive seventy-five percent of the winning amount, while the second virtual participant 180 would receive twenty-five percent of the winning amount.

In some configurations, virtual participants 180 can be rewarded with an increased percentage of the winning amount if they identified winners on individual contests having live events occurring earlier in time. After an individual contest on a given virtual multi-participant contest 140 is declared a winner, the electronic ticket 137 for the virtual multi-participant contest 140 becomes more appealing and other virtual participants 180 may wish to join the ticket 137. Consequently, the virtual participants who entered the earlier virtual stake submissions 143 can be rewarded with an increased percentage of winnings in exchange for assuming the earlier risk and rendering the electronic ticket 137 more attractive.

In some embodiments, an outcome allocation function 148 may be configured to reward a creator of a virtual multi-participant contest 140 (e.g., virtual parlay contest 141) with an increased payout in the event that the virtual multi-participant contest 140 is declared a winner in certain scenarios. If the virtual multi-participant contest 140 is determined to be a winner (e.g., meets both criteria of the creator's virtual stake submission 143 winning and also the remaining virtual stake submissions 143 in the contest winning), all winning virtual stake submissions 143 for the contests receive the same amount. However, if the creator of the parlay also has submitted one (or more) of the winning picks, the creator may receive a bonus (e.g., 102% of the equal leg payout). In the event the creator has entered multiple virtual stake submissions 143 into the contest, the bonus payout may only be applied to one of the winning virtual stake submissions 143. Additionally, in the event that the creator fills all individual contests in the virtual multi-participant contest 140, the bonus may not be applied to any of the virtual stake submissions 143 and/or a smaller bonus may be applied to one of the virtual stake submissions 143 (e.g., 101% of the equal leg payout).

Many other techniques also can be used by an outcome allocation function 148 to allocate winnings among virtual participants of a virtual multi-participant contest 140.

The manner in which an outcome allocation function 148 distributes losses also can vary. In some configurations, losses can be equally or evenly distributed among all of the virtual participants 180 of a given virtual multi-participant contest 140 based on the number of virtual stake submissions 143 submitted by each virtual participant 180.

In one example, a given virtual multi-participant contest 140 may be comprised of six individual contests and six separate virtual participants 180 may each enter a single virtual stake submission 143 into the contest. In the scenario of a losing ticket, each loser would pay one-sixth of the total loss amount. In another example, a given virtual multi-participant contest 140 may be comprised of four individual contests and a first virtual participant enters two virtual stake submissions 143 into the contest, while a second virtual participant and third virtual participant each enter a single virtual stake submission 143 into the contest. In this scenario, the first virtual participant would pay fifty percent of the losses, while the second and third virtual participants would each pay twenty-five percent of the losses.

In other configurations, losses are only paid by the virtual participants 180 who entered losing virtual stake submissions 143 into a virtual multi-participant contest 140. That is, in the event that an electronic ticket 147 loses, the virtual participants 180 who submitted winning entries would have their funds returned, and the virtual participants who submitted losing entries would equally divide the total loss amount based on the number of losing virtual stake submissions 143 submitted by each losing virtual participant. Other techniques can be utilized by the outcome allocation function 148 to allocate losses as well.

In some embodiments, during an ongoing virtual multi-participant contest 140, the wagers submitted for each virtual stake submission 143 in the contest are initially locked or held by the electronic platform 150. However, the wager amount associated with a winning virtual stake submission 143 may be returned to the virtual participant 180 who correctly predicted the winning outcome without waiting for outcome determinations on the remaining virtual stake submissions 143 included within the virtual multi-participant contest 140. This serves to free or release the funds of the virtual participant 180 immediately, or shortly after, winning an individual contest and allows the virtual participant 180 to apply those funds to other virtual stake submissions 143 and/or virtual contests.

In some cases, virtual participants 180 who create virtual multi-participant contests 140 can select different options for determining how winnings and/or losses are allocated among virtual participants 180 who enter virtual stake submissions into the virtual multi-participant contests 140. Additionally, or alternatively, the framework for allocating winning and/or losses to the virtual participants 180 can be set or predetermined by the electronic gaming platform 150. Any details or criteria relating to allocating winnings or losses can be listed on the electronic tickets 147 corresponding to the virtual multi-participant contests 140 to promote transparency among virtual participants 180.

In certain embodiments, the outcome allocation function 148 applied to virtual parlay contests 141, virtual teaser contests 142, and/or other virtual multi-participant contests 140 can be configured to allocate winnings/losses based on a "big favorite" adjustment configuration. Rather than have all winners and losers split evenly, the winnings or losses can be adjusted to account for the inherent differences in odds in this configuration. In some examples, virtual participants 180 who are winners split the proceeds evenly, but the if a virtual participant has bet a favorite with the odds exceeding a pre-determined threshold, the loss will likely fall more heavily on the virtual participant 180 who chose the (losing) large favorite with the odds in excess of the threshold.

Up to a certain level or threshold of favorite odds (programmed into contest and subject to change), all losses may be treated the same in the big favorite adjustment configuration. Thus, since most games are assumed to be odds of −110 (risking −$110 to win $100), this can be used as a baseline in some embodiments. If all game bets or virtual stake submissions have these odds, no adjustment is needed, as all losing bets split the total wager amount evenly. All winning bets split the proceeds proportionally to their number of picks or virtual stake submissions included within the virtual parlay contest (or other type of contest). While it is possible to split the winnings unevenly based upon the underlying odds of each game itself in some embodiments, this may not be preferrable because it is contrary to the basic premise of a parlay (more resembling an aggregation of straight bets than a parlay). The opposite side of this is that adding favorites with odds larger than −110 to parlays, while theoretically making the parlay slightly more likely to win, it does so at the cost of a lower total payout for parlays containing these larger favorites. Since the lesser payout directly comes from the larger favorite odds, the big favorite adjustment configuration determines that these "Big Favorites" would bear a greater portion of risk in the case of this pick losing alongside other bets.

Additionally, in some embodiments, any wager that does not exceed the chosen threshold is treated as though it had odds of −110, which can be referred to as "the loss allocation factor." This includes slightly bigger favorites not exceeding the threshold (−120 or −125, for example), as well as any underdogs (+200, where the pick risks $100 to win $200, e.g.). Above the threshold, the loss allocation factor is the favorite's odds. The odds of the loss allocation factor for all losing picks in the virtual parlay contest are added together, and the loss can be determined and allocated by the ratio of the pick's loss allocation factor divided by the sum of all loss allocation factors.

In certain embodiments, virtual parlay contests 141, virtual teaser contests 142, and/or other virtual multi-participant contests 140 can be configured in a unique arrangement for distributing winnings/losses among virtual participants that facilitates region-agnostic processing of contests. In these contests, each virtual participant can enter a virtual stake submission 143 ("Initial Bet") on an event-related outcome, such as a sports-related outcome, in concert with a specified number of other virtual stake submissions 143 (the "Conditional Part" of the bet). If the Initial Bet wins, the virtual participant 180 will get the amount risked back. In addition, the virtual participant 180 also will win a specified additional amount if the Conditional Part of the bet also wins—i.e., if all components of the Conditional Part of the wager ends either in a win or push (e.g., ends in a tie or the bet is cancelled before its completion). If the Initial Bet ends in a push, the virtual participant 180 gets the initial amount risked back, but has no stake in the results of the Conditional Part.

Additionally, if the Initial Bet loses, the virtual participant 180 is responsible for part or all of the amount at risk, depending upon the subsequent results in the Conditional Part of the bet. If all parts of the Conditional Bet win or push, the virtual participant 180 loses the entire amount at risk. If other bets within the Conditional Part lose, these virtual participants 180 split the amount risked pursuant to specified loss allocation rules (and which may be specified and agreed upon by the virtual participant 180 at the time of registering their account and/or at the time when virtual stake submissions 143 are entered).

Figure 6:
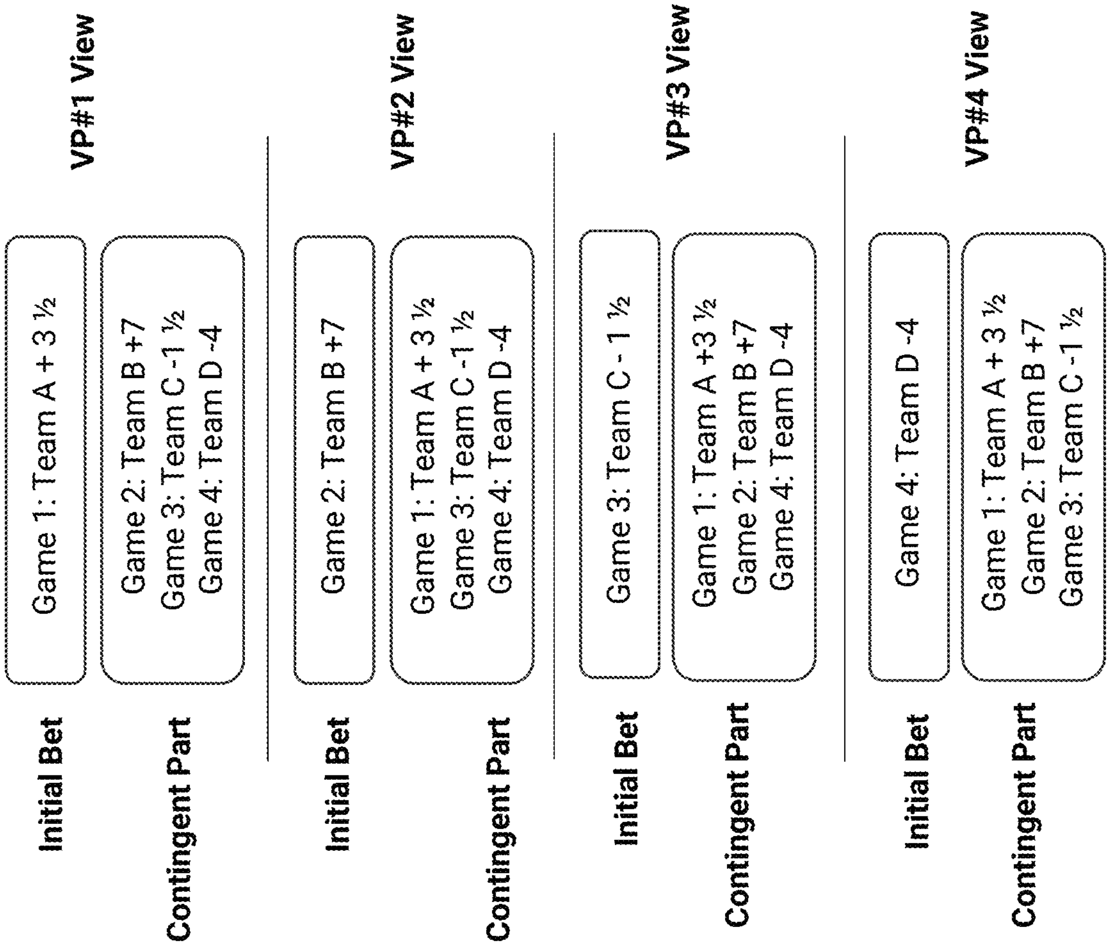
FIG. 6 is a diagram illustrating an exemplary configuration for a virtual contest according to certain embodiments.

FIG. 6 illustrates an example of a 4-game virtual parlay contest 141 configured in the above arrangement. Within this contest, all four virtual participants (VP #1-4) have a different view of the contest. For the virtual participant (VP #1) that chose Team A in Game 1, the Initial Bet is only dependent upon the outcome of Game 1, adjusted for the +3½ point spread. The other part of the parlay, the Contingent Part, will determine whether there is any additional payout should the virtual stake submission 143 on the Initial Bet prevail. In this gaming format, it does not matter from what geographic region the virtual stake submissions 143 may have originated, as the location of the selection of the game does not alter with whom the bet is settled (either in the case of a winning bet or a losing one). The exact same logic applies for each of the other virtual stake submissions 143, even though each player's Initial Bet and Contingent Part is different. Processing virtual contests and virtual stake submissions 143 in this manner can help ensure compliance with location specific protocols 161 of each geographic region, and facilitates region-agnostic or state-agnostic participation.

FIGS. 7A-7E illustrate exemplary graphical user interfaces (GUIs) that may be accessed via the collaborative gaming application 155 according to certain embodiments. In some scenarios, these interfaces may only be accessed by users or virtual participants 180 that have been authorized by the geolocation authentication system 160 and/or that have been authorized to access the collaborative gaming application 155 in the unrestricted functionality state.

Figure 7A:
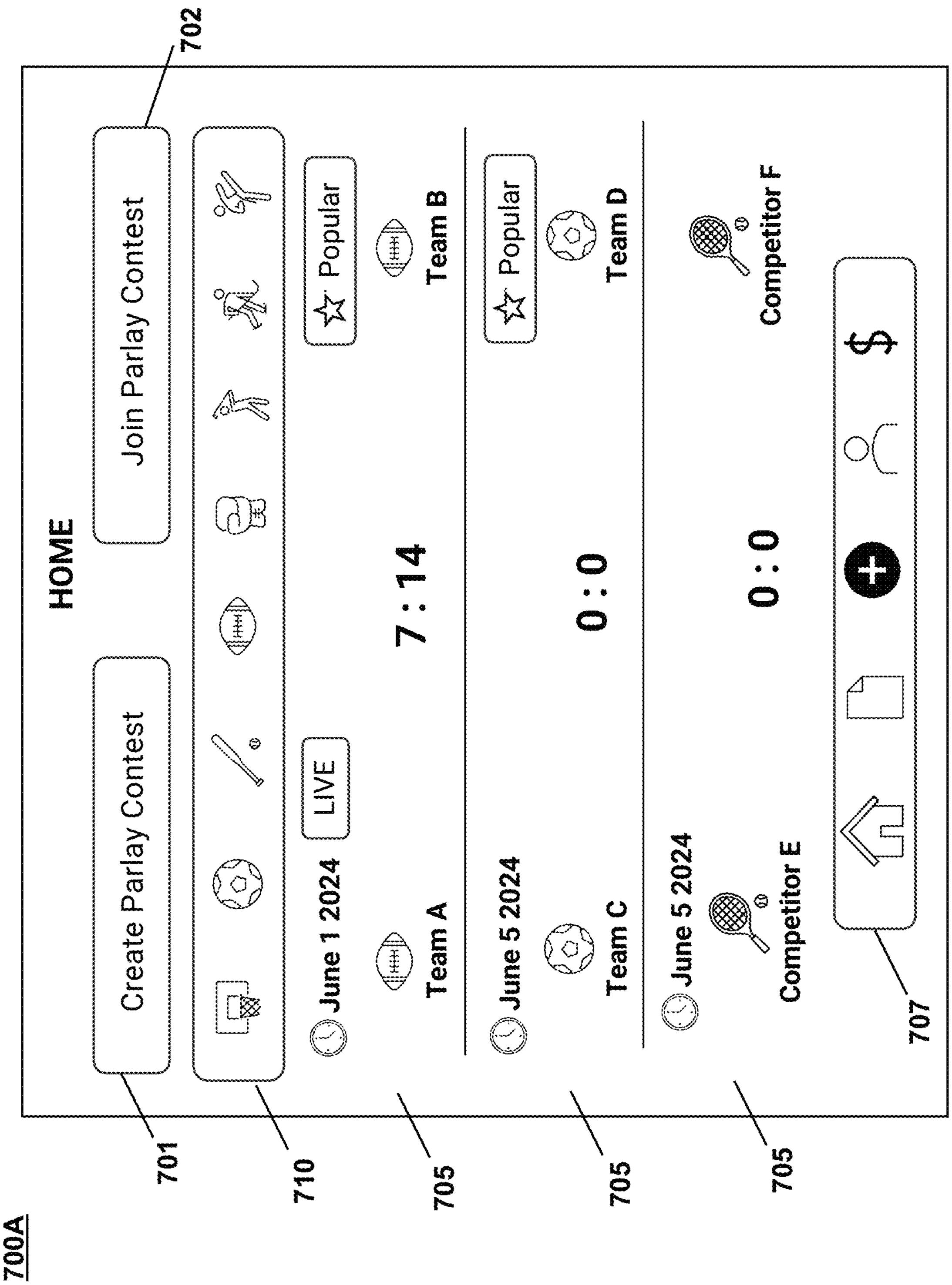
FIG. 7A is an exemplary interface that can be accessed via a collaborative gaming application according to certain embodiments.

FIG. 7A illustrates an exemplary interface 700A that includes a first option 701 for creating a virtual parlay contest 141 and a second option 702 for joining a virtual parlay contest 141. Selection of the first option 701 may enable an authorized virtual participant 180 to access one or more GUIs for establishing a virtual parlay contest 141 and specifying definition criteria for the virtual parlay contest 141. Selection of the second option 702 may enable the authorized virtual participant 180 to access to one or more GUIs for viewing details of existing virtual parlay contests 141 and/or joining one or more of the existing virtual parlay contests 141.

The interface 700A further includes a plurality of event listings 705 corresponding to ongoing and/or upcoming live events. The region of the interface that presents the event listings 705 may be scrollable to permit viewing of additional event listings 705. Each event listing 705 may identify a start date and time for a corresponding live event, a game type for the corresponding live event, a current score for the corresponding live event (e.g., if the live event is currently ongoing), the teams or competitors associated with the corresponding live event, and/or other details associated with the live events. The event listings 705 also may be annotated with various types of indicators, such as indicators identifying whether the corresponding event is ongoing (or “LIVE”) and/or whether the corresponding event is trending (or “Popular”) such that it has been frequently selected for virtual stake submissions 143 during a recent time period.

The event listings 705 displayed on the interface 700A may be generated, at least in part, using real-time or up-to-date event data that is obtained from one or more electronic data providers 130. The electronic gaming platform 150 may continuously poll or receive the event data to update the scores, event status, and/or other information associated with the live events.

A contest type filtering option 710 can enable an authorized user to filter the types of live events that are displayed in the event listings 705. For example, the contest type filtering option 710 can enable the authorized virtual participant 180 to select desired game types and any event listings 705 that do not match the selected game types may be removed or filtered from the section of the interface 700A that displays the event listings 705.

A navigation menu 707 provides a plurality of selectable options that enable the authorized user to access various functionalities and/or interfaces of the collaborative gaming application 155. In this example, the navigation menu 707 includes a home option, a submission tracking option, a contest creation option, a collaboration portal option, and funds management option. The submission tracking option can enable the authorized virtual participant 180 to access one or more interfaces for tracking ongoing and/or previous virtual parlay contests 141 that been entered by the virtual participant 180. For example, an interface may display a listing of previous or ongoing electronic tickets 147 for virtual parlay contests 141 that have been entered by the virtual participant 180. The electronic tickets 147 may be selected to enable the virtual participant 180 to determine the status of an ongoing electronic ticket 147 (e.g., to determine which individual contests have been declared winners already and/or to check dates or times of upcoming individual contests). Electronic tickets 147 for previous virtual parlay contests 141 that have already concluded also can be accessed to view details of historical contests (e.g., to determine which individual contests were declared winners/losers, view previous winning/loss allocations, etc.).

The contest creation option can enable the authorized virtual participant 180 to access one or more interfaces for creating a new virtual parlay contest 141 in the same or similar manner as the first option 701 mentioned above. The home option can enable the authorized virtual participant 180 to return to the interface 700A illustrated in FIG. 7A after the user has navigated to a different interface. The funds management option may enable the authorized user to access one or more interfaces for viewing and managing funds on the electronic gaming platform 150. For example, the one or more interfaces may enable the authorized user to deposit funds, withdraw funds, view available funds, connect payment options, etc.

The collaboration portal option can enable the authorized virtual participant 180 to access one or more interfaces for collaborating with other virtual participants 180. Amongst other things, the interfaces may include functionalities that enable the authorized virtual participant 180 to send requests to connect with other virtual participants (e.g., to send connection requests or “friend” requests), communicate with other virtual participants 180 (e.g., via text, video, audio, etc.) that have been added as friends or connections, share virtual parlay contests 141 (or other types of virtual contests) with other virtual participants 180 that have been added as friends or connections, and/or share event listings 705 with other virtual participants 180 that have been added as friends or connections.

Figure 7B:
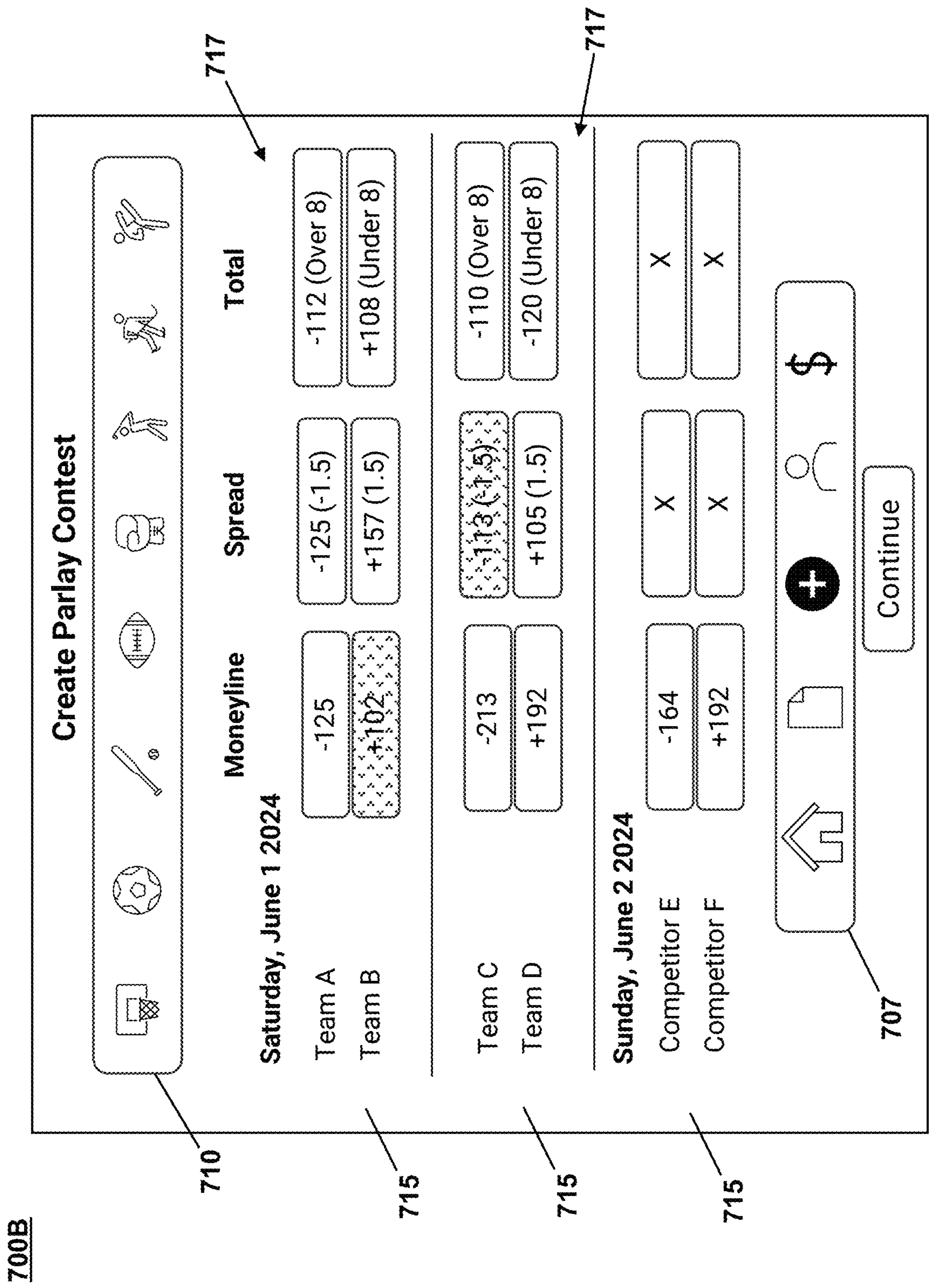
FIG. 7B is another exemplary interface that can be accessed via the collaborative gaming application according to certain embodiments.
Figure 7C:
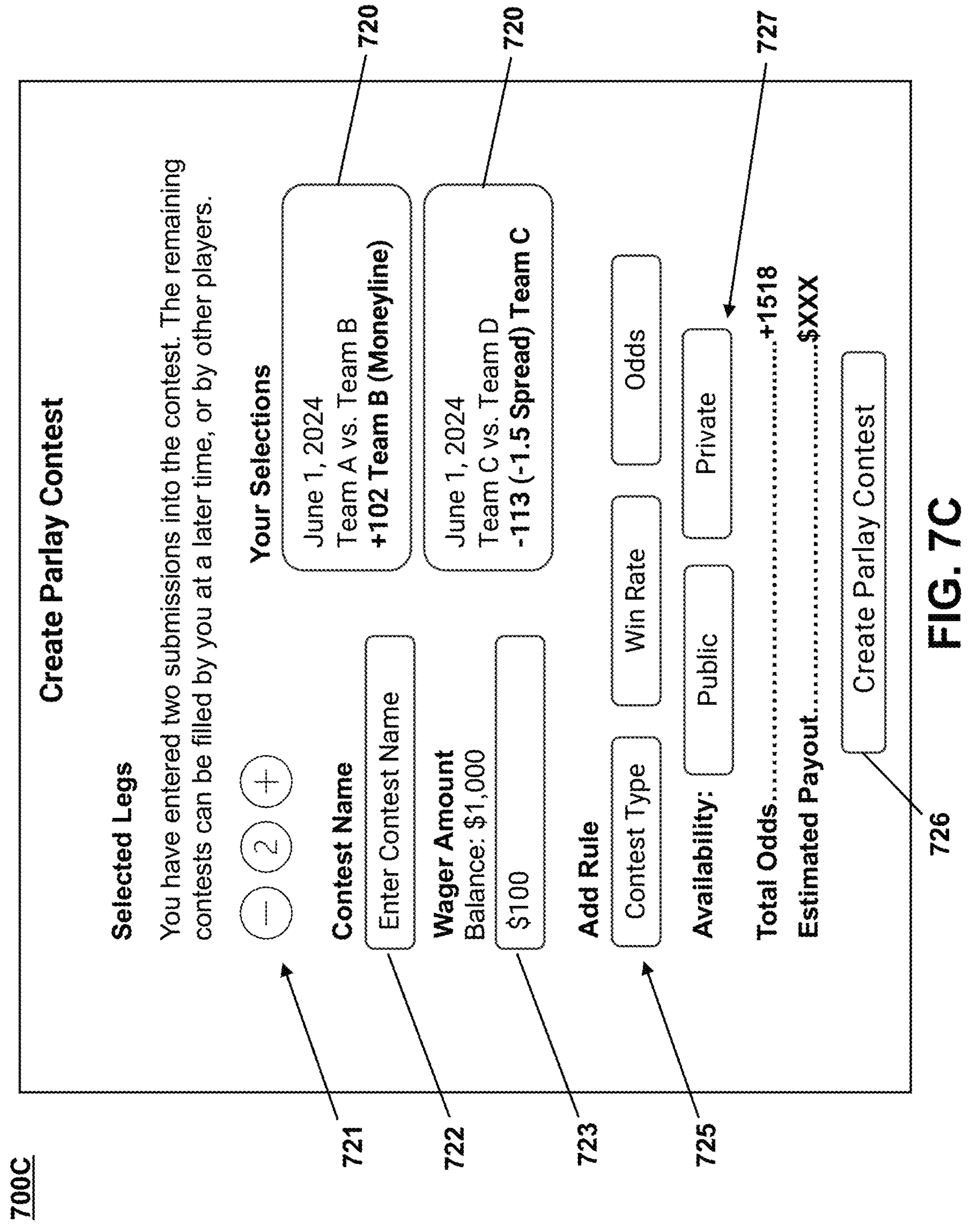
FIG. 7C is another exemplary interface that can be accessed via the collaborative gaming application according to certain embodiments.

FIGS. 7B and 7C are exemplary interfaces that enable an authorized virtual participant 180 to create a new virtual parlay contest 141. In some examples, these interfaces may be accessed by selecting the first option 701 and/or the contest creation option included on the navigation menu 707.

The interface 700B in FIG. 7B provides a listing of individual contest options 715. The region of the interface that presents the individual contest options 715 may be scrollable to permit viewing of additional individual contest options 715. Each individual contest option 715 may identify an individual contest, the teams or competitors associated with the contest, and a plurality of selectable odds options 717 associated with the contest. In this example, the odds options 717 include moneyline options, spread options, and total options (or over/under options). Some odds options 717 may not be available for particular individual contest options 715 and/or particular types of individual contest options 715 (as indicated by the bottom individual contest option 715 shown on the interface).

The authorized virtual participant 180 may be permitted to select one or more of the odds options 717 to enter a prediction for a virtual stake submission 143 being entered into the virtual parlay contest 141 that is being created. In this example, the authorized virtual participant 180 has selected odd options 717 for two separate individual contest options 715 (i.e., a +102 moneyline option on a first contest and −113 spread option on a second contest), which will result in the entry of two virtual stake submissions 143 with these corresponding predictions into the virtual parlay contest 141 being created.

The individual contest options 715 displayed on the interface 700B may be generated, at least in part, using real-time event data, such as real-time odds data, that is obtained from one or more electronic data providers 130. The electronic gaming platform 150 may continuously poll or receive the odds data to update the selectable odds options 717 associated with the individual contests, and the odds associated with the each of the individual contest options 715 may vary over time.

On this interface 700B, the contest type filtering option 710 can enable an authorized virtual participant 180 to filter the types of live events that are displayed in the individual contest options 715. For example, the contest type filtering option 710 can enable the authorized user to select desired game types and any individual contest options 715 that do not match the selected game types may be removed or filtered from the section of the interface 700B that displays the individual contest options 715.

Once the authorized virtual participant 180 has specified at least one prediction (e.g., by selecting an odds option 717 for a desired individual contest), the virtual participant 180 may select the continue option located on the bottom of the interface to proceed with setting up with the virtual parlay contest 141.

The interface 700C in FIG. 7C enables the authorized virtual participant 180 to continue setting up the virtual parlay contest 141 and to specify various definition criteria for the virtual parlay contest 141. The interface 700B displays the predictions 720 selected by the authorized user on the previous interface 700A. The interface 700B further includes a contest quantity option 721 that enables the virtual participant 180 to specify the number of individual contests to be associated with the virtual parlay contest 141 being created. In this example, the virtual participant 180 may select the plus or minus options to increase or decrease the number of individual contests as desired. In some embodiments, the virtual parlay contest 141 may be required to include two or more individual contests at a minimum. In some typical scenarios, adding additional individual contests to the virtual parlay contest 141 will increase the potential winnings while simultaneously potentially decreasing the odds of winning.

A contest name option 722 permits the authorized virtual participant 180 to enter a name or title for the virtual parlay contest 141 being created. A wager option 723 permits the authorized virtual participant 180 to specify a wager amount for each prediction 720, or corresponding virtual stake submission 143, that is entered into the virtual parlay contest 141. A plurality of entry rule options 725 permit the authorized virtual participant 180 to specify one or more entry rules for the virtual parlay contest 141. In some examples, the entry rules may be defined that restrict virtual stake submissions 143 associated with the virtual parlay contest 141 to desired types of live event types (e.g., basketball games, baseball games, etc.), require virtual participants to have a minimum win rate, and/or restrict virtual stake submissions 143 to include odds options within desired odds ranges.

An availability option 727 enables the authorized virtual participant 180 to specify whether the virtual parlay contest 141 is to be hosted in a public format or private format. As explained above, virtual parlay contests 141 hosted in a public format setting can be joined by any virtual participant 180 determined to be an authorized user of the electronic gaming platform 150, and the electronic gaming platform 150 can assist with crowdsourcing virtual stake submissions 143 to fill the virtual parlay contests. Virtual parlay contests 141 hosted in the private format setting may only be joined by a limited number of virtual participants 180, such as specific virtual participants 180 that the creator can authorize to join. In some embodiments, if the creator of the virtual parlay contest 141 selects the private option, the creator may be presented with another interface or overlay that enables the creator to identify the virtual participants 180 who are authorized to join the virtual parlay contest 141 and/or send electronic invites to those virtual participants 180.

Once the authorized virtual participant 180 has specified criteria for the virtual parlay contest 141, the virtual participant 180 may select a submission option 726 to create or initialize the virtual parlay contest 141. The virtual parlay contest 141 created by the authorized user may then be hosted on, and managed by, the electronic gaming platform 150 until its completion. Additionally, the electronic gaming platform 150 may create an electronic ticket 147 for the virtual parlay contest 141.

Figure 7D:
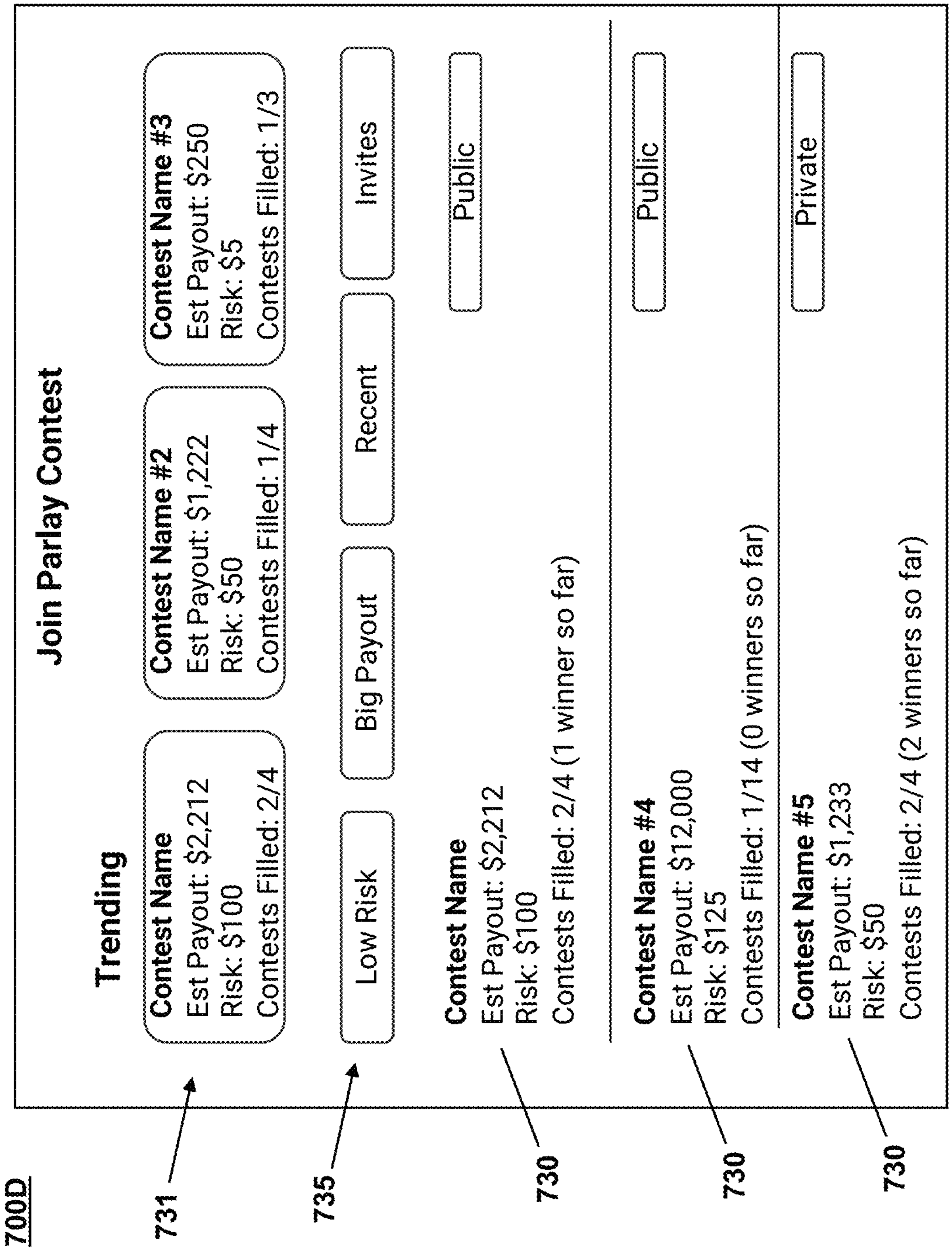
FIG. 7D is another exemplary interface that can be accessed via the collaborative gaming application according to certain embodiments.
Figure 7E:
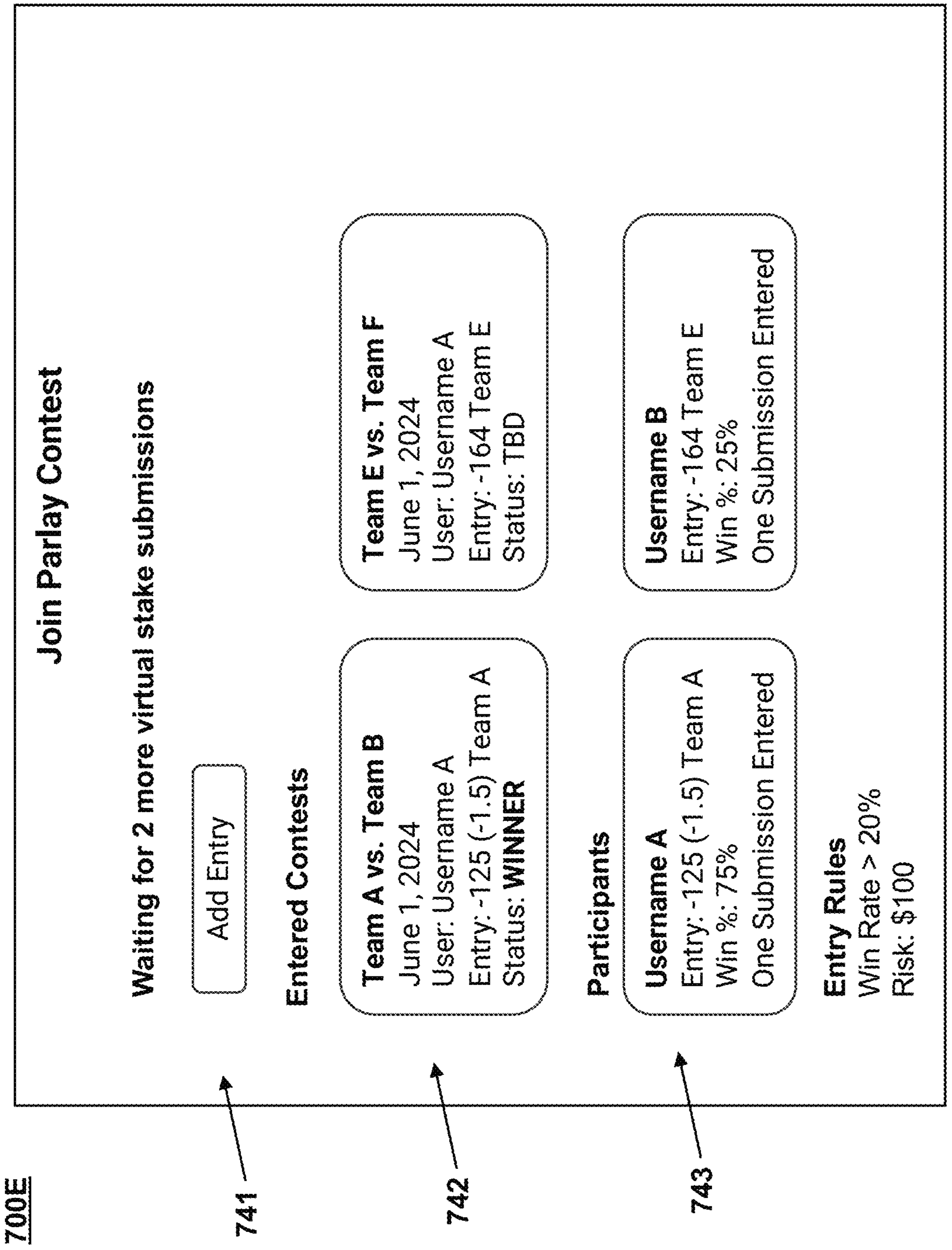
FIG. 7E is another exemplary interface that can be accessed via the collaborative gaming application according to certain embodiments.

FIGS. 7D and 7E are exemplary interfaces that enable an authorized virtual participant 180 to join an existing virtual parlay contest 141. In some embodiments, the interfaces may be accessed by selecting the second option 702 presented on the interface 700A illustrated in FIG. 7A.

The interface 700D in FIG. 7D includes a listing of virtual contest options 730 corresponding to ongoing virtual parlay contest 141 that are being hosted on the electronic gaming platform 150. The region of the interface that presents the virtual contest options 730 may be scrollable to permit viewing of additional virtual contest options 730. Each virtual contest option 730 may display various information about the corresponding virtual parlay contests 141 to enable the virtual participant 180 to assess and select desired the virtual contest options 730. In this example, each virtual contest option 730 displays the name or title of the virtual parlay contest 141, an estimated payout value if the virtual parlay contest is determined to be a winner (e.g., which may be estimated based on the odds options 717 selected for the virtual stake submissions already entered into the virtual parlay contest 141 and/or the number of individual contests included the virtual parlay contest 141), the maximum number of virtual stake submissions 143 that may be entered into the virtual parlay contest 141, the current number of virtual stake submissions 143 that have been entered into the virtual parlay contest 141, the number of virtual stake submissions 143 in the virtual parlay contest 141 that have already been declared a winner, a risk or wager amount required to join the virtual parlay contest 141, and/or a public or private format setting specified for the contest. In some cases, the virtual contest option 730 may display other information associated with the virtual parlay contests 141 (e.g., such as virtual participants 180 that have entered the contests, win percentages of the virtual participants 180, entry rules, and/or definition criteria associated with the contests).

In this example, the listing of virtual contest options 730 includes both public and private contest options. While the private contest options are included in the listing, the virtual participant 180 may be prohibited from joining the contests unless the contest creator, or another invited virtual participant 180, has authorized the virtual participant 180 to join (e.g., such as by sending an electronic invite). In other examples, the listing of virtual contest options 730 may only display public contest options, and details of private contest options may only be accessible or viewable by the virtual participants 180 who are authorized to join those contests.

A plurality of contest filtering options 735 enable the authorized virtual participant 180 to filter the listing of virtual contest options 730 based on various criteria. In this example, the contest filtering options 735 may enable the authorized virtual participant 180 to filter the virtual contest options 730 to only display low risk options (e.g., such as virtual parlay contests 141 that already have one or more winning virtual stake submissions 143, virtual parlay contests 141 that have a relatively small number of individual contests, and/or virtual parlay contests 141 that have a relatively small outlay in the scenario where the virtual participant 180 submits the only losing virtual stake submission 143), big payout options (e.g., which are estimated to provide a relatively large amount of winnings if the virtual parlay contest 141 is determined to be a winner), recently created contests (e.g., which may show virtual parlay contests 141 created in a recent time period), and invited contests (e.g., which may include contests hosted in a private formatting setting that the virtual participant 180 has been invited to join). Other types of filtering criteria also may be incorporated into the contest filtering options 735.

The authorized virtual participant 180 may scroll through the virtual contest options 730 presented on the interface 700D and select one or more desired virtual contest option 730 to join corresponding virtual parlay contests 141.

FIG. 7E illustrates an exemplary interface 700E that may be displayed in response to the authorized virtual participant 180 selecting a virtual contest option 730 corresponding to a desired virtual parlay contest 141.

A submission entry section 741 identifies the number of unfilled individuals contests for the virtual parlay contest 141. In this example, there are two unfilled contests and the authorized virtual participant 180 may enter up to two virtual stake submissions 143 into the virtual parlay contest. The add entry option may be selected to enter the virtual stake submissions 143.

An entered contest section 742 of the interface 700E displays the virtual stake submissions 143 that have already been entered into the virtual parlay contest 141, as well as details relating to each of the entered virtual stake submissions 143 (e.g., such as details identify the contest selected for the virtual stake submission 143, the teams or competitors involved in the contest, the date/time of the contest, the status of the contest, etc.).

A participant section 743 of the interface 700E identifies the virtual participants 180 who entered virtual stake submissions 143 into the virtual parlay contest, as well as details identifying the number of submissions entered by each virtual participant 180, the predictions or odds options selected by each the virtual participant 180, and/or the win percentage of each virtual participant 180.

An entry rule section 744 of the interface 700E identifies entry rules that were specified for the virtual parlay contest 141 by the virtual participant 180 who created the virtual parlay contest 141. In this example, the creator specified the risk amount for the parlay contest and added an entry rule restricting submission of virtual stake submissions 143 to virtual participants 180 who have a win percentage equal to or exceeding twenty percent. Thus, the authorized virtual participant 180 accessing the interface 700E will only be permitted to enter a virtual stake submission 143 if the virtual participant 180 satisfies this win percentage criteria and is willing to enter the specified risk amount.

If the authorized virtual participant 180 decides to enter a virtual stake submission 143 into the virtual parlay contest 141 (e.g., by selecting the add entry option at the top of the interface 700E), the virtual participant 180 may be presented with the same or similar interface illustrated in FIG. 7B. Using this interface, the authorized virtual participant 180 can select contest options 715 and available odds options 717 to enter a virtual stake submission 143 into the virtual parlay contest 141 at the specified risk amount.

While the exemplary interfaces illustrated in FIGS. 7A-7E demonstrate various features and functionalities of creating and joining virtual parlay contests 141, the same or similar interfaces can be presented or adapted to create and join virtual teaser contests 142 and/or other types of virtual multi-participant contests 140.

In certain embodiments, the electronic gaming platform 150 can include a backend monitoring system 170 that is configured to execute functions associated with monitoring, tracking, and managing all virtual contests hosted by the electronic gaming platform 150. Amongst other things, the backend monitoring system 170 can execute functions that identify high-risk virtual contests hosted on the electronic gaming platform 150 and/or high-risk live events associated with the virtual contests. The backend monitoring system 170 also can include various administrative controls for managing virtual contests and user accounts.

Figure 4:
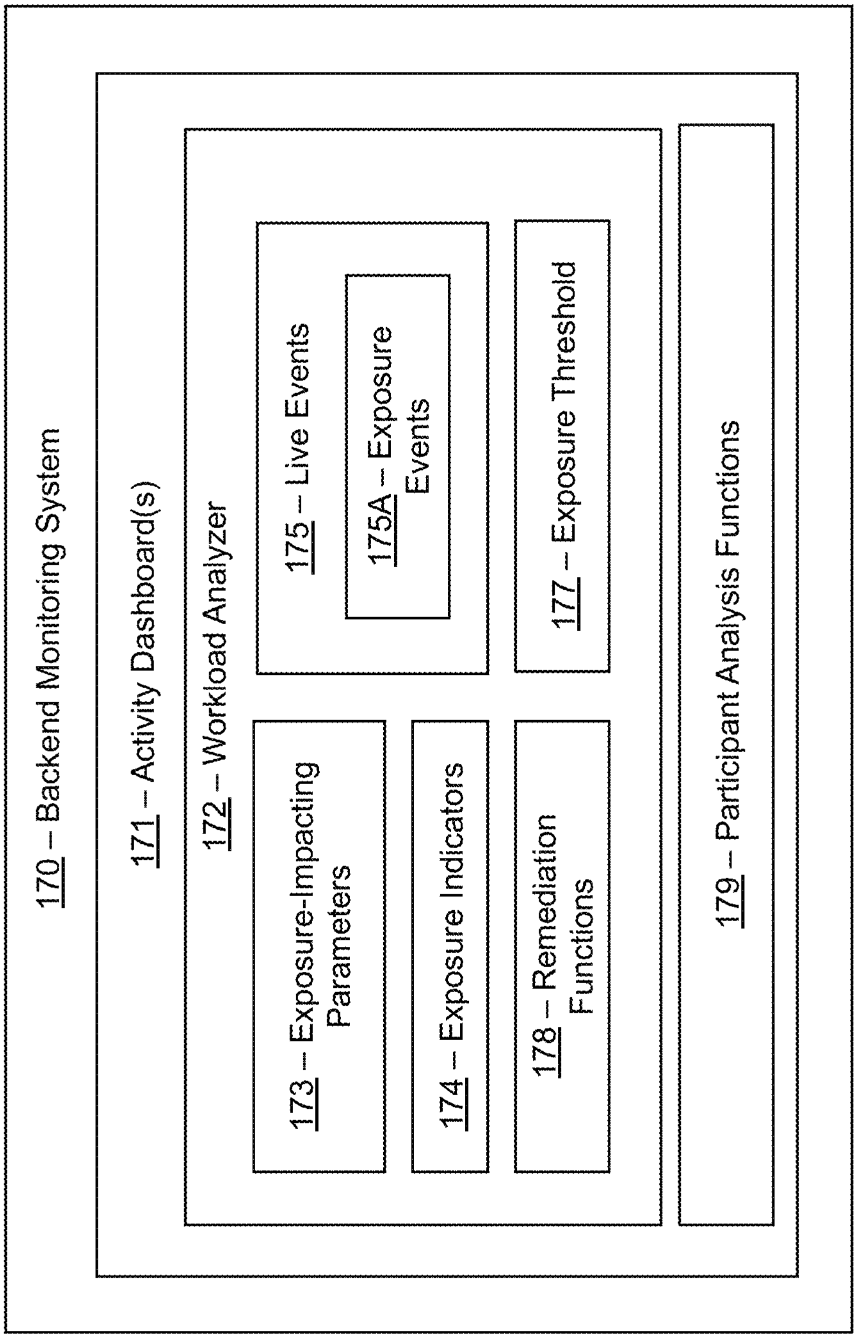
FIG. 4 is a block diagram illustrating exemplary features and functionalities of a backend monitoring system in accordance with certain embodiments.

FIG. 4 is a block diagram illustrating exemplary features and functions associated with a backend monitoring system 170 according to certain embodiments. The backend monitoring system 170 can provide a portal that is accessible to administrative users or other individuals who assist with maintaining the electronic gaming platform 150.

Upon accessing the backend monitoring system 170, a user may be presented with an activity dashboard 171 on one or more GUIs. The activity dashboard 171 can display, visualize, and/or summarize various user activities on the electronic gaming platform 150 for both the current time period and historical time periods. For example, based on an analysis of aggregated contest information for a current or historical time period, the activity dashboard 171 may generate and display various charts, graphs, and statistics summarizing user activities on the platforms (e.g., indicating the total number of contests during the time period, total number of virtual participants, average wager amounts, popular contests, popular contest formats, etc.). The backend monitoring system 170 also can include various controls for managing the virtual contests hosted by the electronic gaming platform 150 and managing virtual participants (or corresponding user accounts) registered with the electronic gaming platform 150.

The backend monitoring system 170 also can be configured to track the individual and aggregated bets (e.g., virtual wager submissions 143) across the electronic gaming platform 150, such as by measuring how many bets, of what size, with what odds and point spreads have been included in virtual parlay contests 141, virtual teaser contests 142, and/or other virtual multi-participant contests 140 currently active in the system. The backend monitoring system 170 can be configured to measure and analyze the historical bets and previously held contests.

The backend monitoring system 170 can continuously store or track information as wagers or bets included in virtual wager submissions 143 are added into contests and as graded wagers go to final. Additionally, the backend monitoring system 170 can generate analytics displays and reports which capture the current exposure of the electronic gaming platform 150. Once captured, the risks are subject to change (which may be reflected in updated analytics displays and reports). As explained in further detail below, the backend monitoring system 170 can utilize various techniques to identify and display any anomalous outliers which may require attention or remediation actions. Parameters can be programmed into the system to flag outliers and the potential action areas.

In some embodiments, an administrative user can access analysis information generated by a workload analyzer 172 via the activity dashboard 171. The workload analyzer 172 can be configured to analyze ongoing virtual contests to identify live events (e.g., live sporting events) or outcomes of live events that expose the electronic gaming platform 150 to high-risk scenarios (e.g., scenarios which may cause a substantial loss to the electronic gaming platform 150 depending on an outcome of the live events). The live events 175 (or outcomes of the live events) that are identified as high-risk can be designated as exposure events 175A, and can be flagged or highlighted for review by administrative users. Additionally, as explained below, the backend monitoring system 170 can present administrative users with a variety of remediation functions 178 to mitigate or reduce the exposure of the electronic gaming platform 150 with respect to any exposure events 175A identified by the workload analyzer 172.

Traditional online gaming platforms have no means of assessing exposure or risk in virtual multi-participant contests and/or other types of combination contests. Assessing risk or exposure levels for these contests can be technically challenging for a variety of reasons. With combination contests, variability in contest outcomes exponentially increases and causes significant complexities in attempting to forecast outcomes, or even identify potential high-risks scenarios. These contests can comprise multiple wagers on different outcomes of various live events, and each can have their own set of odds. Moreover, the wagers in each of the contests can be correlated in different ways, such that the outcome of one contest can affect other contests. This variability of, and dependencies among, virtual contests causes difficulties in accurately assessing exposure of the electronic gaming platform 150 at any given point in time. To address these and other technical challenges, the workload analyzer 172 can execute an exposure evaluation algorithm that assesses the variability and dependency of virtual multi-participant contests 140, and other types of combination contests, to accurately identify or predict an exposure level at any given point in time.

To evaluate exposure, the workload analyzer 172 can initially identify all live events 175 that have been included in at least one virtual stake submission 143 entered into at least one pending combination contest. For each identified live event 175, the workload analyzer 172 can analyze the exposure of the live event 175 based on an analysis of a plurality of exposure-impacting parameters 173, and can assign an exposure indicator 174 to the live event 175 that quantifies or represents the exposure created by the live event 175. The exposure indicators 174 assigned to each live event 175 can then be compared to an exposure threshold 177, which can include a value, or range of values, that represents a threshold level or risk of exposure. Live events 175 having exposure indicators 174 exceeding the exposure threshold 177 can be identified and designated as exposure events 175A, which can be flagged or highlighted for further review by administrative users.

The workload analyzer 172 can calculate or determine the exposure indicator 174 for each live event 175 based on a variety of exposure-impacting parameters 173. Exemplary exposure-impacting parameters 173 can include:

(a) Submission Quantity Parameter: This parameter considers the total number of all virtual stake submissions 143 that identify the live event (or a particular outcome of the live event) across all pending or ongoing combination contests (e.g., virtual parlay contests 141 and virtual teaser contests 142). In general, greater numbers of virtual stake submissions 143 identifying the live event 175 (or particular event outcome) increases exposure, while lesser numbers of virtual stake submissions 143 identifying the live event 175 decreases exposure.

(b) Contest Format Parameter: This parameter considers how many individual contests (or contest legs) are included in each combination contest that relies on the live event 175. As explained above, the virtual multi-participant contests 140 and other combination contests can vary in terms of the number of individual contests that are involved (e.g., 4-game virtual parlay contest, 8-game virtual parlay, 20-game virtual parlay contest, etc.), and the potential winnings increase as the number of games grow. In general, greater numbers of individual contests within combination contests relying on the live event 175 (or predicted outcome of the live event) can increase exposure, while lesser numbers of individual contests within combination contests relying on the live event 175 (or predicted outcome of the live event) can decrease exposure.

(c) Current Winning Submission Parameter: This parameter considers how many other virtual stake submissions 143 have been declared winners in combination contests that rely on the live event 175. For example, if seven virtual stake submissions 143 in a 10-game combination contest have already been declared winners and the live events for the remaining three virtual stake submissions 143 have not started, each of those three live events (or predicted outcomes of the live events) increase the exposure and/or likelihood of loss for the electronic gaming platform 150. In general, exposure is increased in scenarios where the live event is placed in contests with greater numbers of virtual stake submissions 143 that have already been declared winners, and exposure is decreased in scenarios where the live event is placed in contests with lesser numbers of virtual stake submissions 143 that have already been declared winners.

(d) Temporal Ordering Parameter: This parameter considers when the live event 175 occurs in relation to other live events that are included in combination contests with the live event. For each combination contest that includes the live event 175, the workload analyzer 172 can determine a chronological ordering of all live events 175 included in the combination contest and identify whether the live event 175 occurs towards the beginning of the ordering or towards the end of the ordering. In general, exposure is increased in scenarios where the live event is placed towards the end of the chronological order (e.g., especially in scenarios where the live events occurring earlier in time have already been declared winners), while exposure is decreased in scenarios where the live event is placed towards the beginning of the event.

(e) Stake Amount Parameter: This parameter considers the wager amounts (or, conversely, the payout amounts) for virtual stake submissions 143 that identify the live event 175. In general, exposure is increased with higher wager amounts, and exposure is decreased with lower wager amounts.

(f) Offsetting Parameter: This parameter considers whether virtual stake submissions 143 have been placed that offset or counterbalance the positions taken on the live event 175 and/or the extent to which those virtual stake submissions 143 offset or counterbalance the positions take on the live event 175. In general, exposure is increased in scenarios where virtual stake submissions 143 are heavily placed on one outcome of the live event, and exposure is decreased in scenarios where virtual stake submissions 143 are more equally balanced and wagers are placed on both opposing outcomes of the live event 175.

To illustrate by way of example, consider a scenario where an 18-game parlay already has seventeen winning virtual stake submissions 143, and the remaining virtual stake submission includes a wager predicting Team A will cover a point spread in a live event involving Teams A and B, which has not yet started. In this scenario, the live event creates a large exposure due to its chronological placement at the end of the contest as reflected by the temporal ordering parameter (and due to the increased odds on an 18-game parlay as reflected by the contest format parameter). The exposure level would be compounded if multiple combination contests involving the same wager on Team A were similarly situated (as reflected by the submission quantity parameter) and/or if the wager amounts for the combination contests were relatively high (as reflected by the stake amount parameter). The exposure level would be further compounded if virtual stake submissions 143 had not been placed to counterbalance the wager (e.g., predicting Team A would not cover the point spread), as reflected by the offsetting parameter.

The workload analyzer 172 can utilize some or all of the aforementioned exposure-impacting parameters 173 (and/or other exposure-impacting parameters 173) to accurately predict and quantify the exposure created by each of the live events 175 or particular outcomes for each of the live events 175. In some cases, the workload analyzer 172 can calculate a total loss to the electronic gaming platform 150 for a worst-case scenario in which all virtual stake submissions 143 corresponding to the live event (or a particular outcome of the live event) are declared winners. In some cases, the exposure indicator 174 for a given live event 175 may comprise a numerical value indicating or predicting the exposure associated with the live event (e.g., on a scale from 0 to 1 or 1 to 10), monetary values indicating or predicting the exposure associated with the live event, and/or a grading label (e.g., low, medium, or high) indicating or predicting the exposure associated with the live event.

After the workload analyzer 172 determines the exposure indicator 174 for a given live event 175 or outcome for the live event 175, the exposure indicator 174 can be compared to an exposure threshold 177. The exposure threshold 177 can represent a value that delineates an acceptable level of exposure from an unacceptable level of exposure, and may be specified by an administrative user in some cases. In some cases, the exposure threshold 177 can be based on a particular monetary value and/or percentage of funds maintained by the electronic gaming platform 150. Live events 175 (or particular outcomes of live events 175) having an exposure indicator 174 that equals or exceeds the exposure threshold 177 can be designated as exposure events 175A.

In some scenarios, the activity dashboard 171 of the backend monitoring system 170 can generate one or more GUIs that display a listing of live events 175 and wagers on outcomes of live events 175 as identified by virtual stake submissions 143. The activity dashboard 171 also can highlight those events or outcomes that are designated as exposure events 175A, and provide access to various remediation functions 178 configured to limit the exposure caused by the exposure events 175A.

Figure 5:
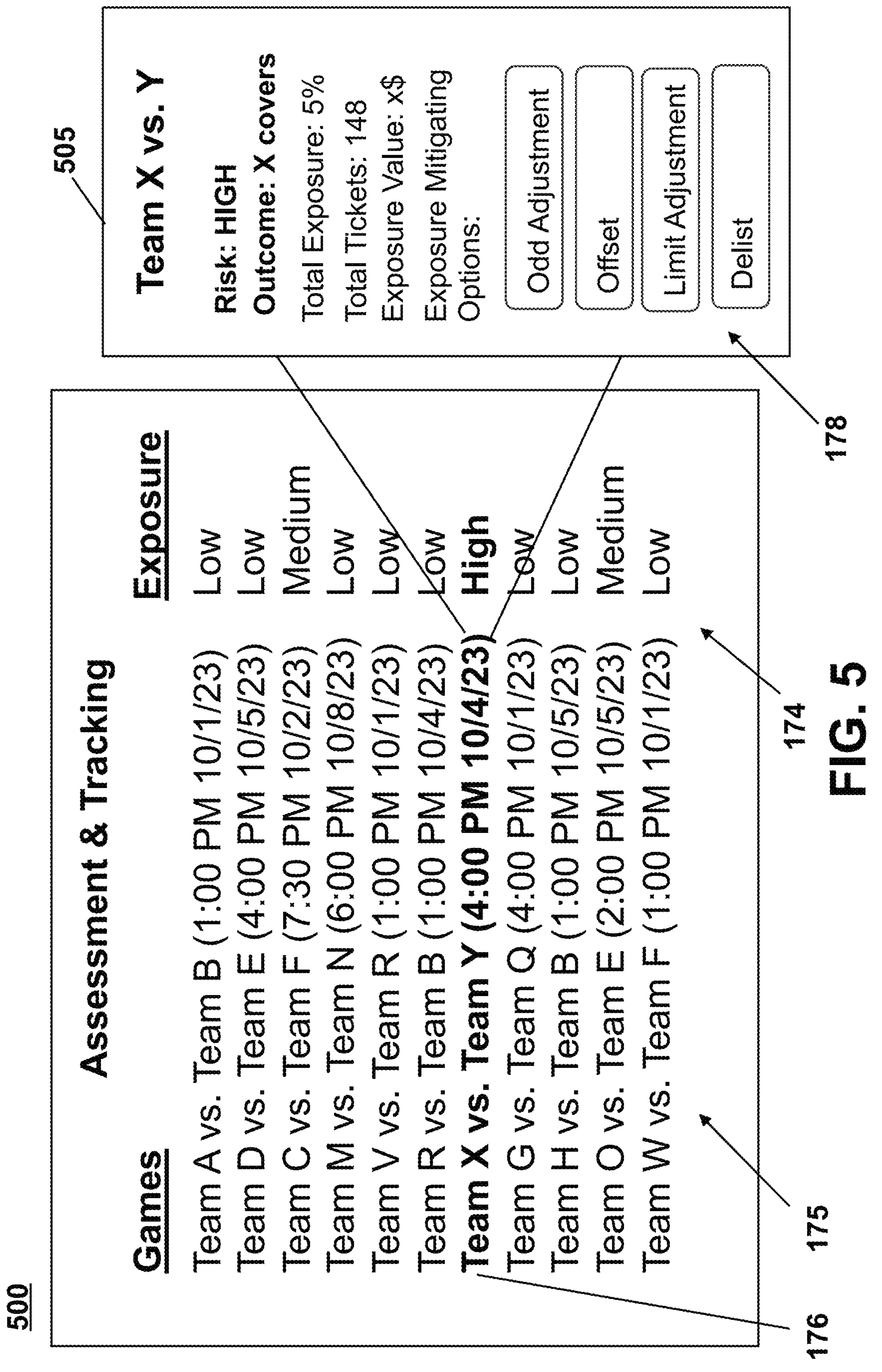
FIG. 5 is an exemplary interface that can be generated by a backend monitoring system in accordance with certain embodiments.

FIG. 5 is exemplary interface 500 that may be accessed via the activity dashboard 171 according to certain embodiments. This exemplary interface 500 can be accessed by administrative users of the electronic gaming platform 150 to assess and mitigate exposure across virtual contests, such as virtual multi-participant contests 140 and/or other combination contests.

A first column displayed on the interface 500 provides a listing of live events 175. When a virtual participant 180 enters a virtual stake submission 143 into a virtual multi-participant contest 140 and/or other combination contest hosted on the electronic gaming platform 150, the virtual participants 180 can select a live event 175 to be associated with the virtual stake submission 143, as well as an outcome for the selected live event 175 (e.g., a point spread outcome, over/under outcome, moneyline outcome, etc.).

As explained above, the workload analyzer 172 of the backend monitoring system 170 can evaluate the risk or exposure resulting from each of the live events (or event outcomes) identified by the virtual stake submissions 143 entered into the virtual contests. Additionally, the workload analyzer 172 can generate various types of exposure indicators 174 corresponding to the live events 175 and/or particular outcomes of the live events 175.

A second column displayed on the interface 500 displays the exposure indicators 174 generated by the workload analyzer 172. In this example, the exposure indicators 174 identify the exposure of an adjacent live event 175 as with a category label (i.e., low, medium, or high). An administrative user can select each of the live events 175 displayed on the interface to view more detailed information.

In this example, an overlay or interface is displayed in response to selecting a live event 175 corresponding to Team X vs. Team Y, which provides event analysis information 505 for the selected event. In addition to indicating that the live event 175 has a high exposure level, the event analysis information 505 provides the administrative user with other useful details.

The event analysis information 505 identifies the outcome of the live event that causes high-risk exposure levels (e.g., Team X covering a point spread). The event analysis information 505 also displays additional exposure indicators 174 identifying a total exposure percentage (e.g., indicating a total percentage of the platform's bank that is exposed) and a total exposure value (e.g., indicating a total loss that would be incurred in a worst-case scenario). It further identifies the total number of electronic tickets 147 that have identified the event outcome in virtual stake submissions 143. In some cases, the event analysis information 505 also can provide details on any offsetting wagers that have been received by the electronic gaming platform 150. The overlay or interface also displays a listing of exemplary remediation functions 178 that can be selected by the administrative user to decrease or balance the risk associated with the live event 175.

Returning to FIG. 4, administrative users can access a variety of remediation functions 178 to mitigate exposure or risk with respect to exposure events 175A. Exemplary remediation functions 178 can include:

(a) Odd Adjustment Function: Selecting this option can present a GUI that enables an administrative user to adjust the odds (e.g., point spread, moneyline, over/under total, etc.) for exposure events 175A (and/or other live events 175). The odds information can be adjusted in a manner that entices virtual participants to submit virtual stake submissions 143 to counterbalance previously submitted virtual wager submissions 143 for exposure events 175A.

(b) Offset Function: Selecting this option can present a GUI that enables an administrative user to place wagers or virtual stake submissions 143 to offset or balance previously submitted virtual wager submissions 143 for exposure events 175A. These offsetting wagers or virtual stake submissions 143 can be placed through the electronic gaming platform 150 and/or with third-party gaming platforms.

(c) Limit Adjustment Function: Selecting this option can present a GUI that enables an administrative user to place limits on wagers or virtual stake submissions 143 relating to the exposure events 175A. For example, this option can allow the administrative user to limit monetary amounts wagered on exposure events 175A (e.g., in connection with entering virtual stake submissions 143 into virtual multi-participant contests 140 and/or other virtual contests hosted on the electronic gaming platform).

(d) Delisting Function: Selecting this option can present a GUI that enables an administrative user to prevent exposure events 175A from being included in future wagers or virtual stake submissions 143 submitted to the electronic gaming platform 150.

An administrative user can select some or all of these remediation functions 178 to mitigate risk and exposure for exposure events 175A and/or other live events 175.

The backend monitoring system 170 also can store and execute participant analysis functions 179 that are configured to provide analytics, statistics, and/or data relating individual virtual participants 180 and/or groups of virtual participants 180. The outputs of the participant analysis functions 179 can be presented on one or more displays presented via the analytics dashboard 171.

In some examples, a participant analysis function 179 can be configured to provide analytics, statistics, and/or data relating to an individual virtual participant 180 that is identified by an administrator user. Each virtual participant 180 may be assigned a unique identifier (ID) that may be utilized to identify and lookup each virtual participant 180. All activities of a virtual participant 180 with respect to utilizing the collaborative gaming application 155 and/or electronic gaming platform 150 may be monitored or tracked by the electronic gaming platform 150 and stored in one or more databases for subsequent retrieval and analysis by the backend monitoring system 170.

For example, for each virtual participant 180, the electronic gaming platform 150 can track and store data indicating some or all of the following: the virtual contests created by the virtual participant 180; the virtual contests joined by the virtual participant 180; the types of virtual contests (e.g., virtual parlay contests 141, virtual teaser contests 142, etc.) in which the virtual participant 180 has participated in historically and/or is currently is participating in; the wager amounts submitted by the virtual participant 180 in virtual contests; the game types (e.g., football games, baseball games, tennis matches, etc.) or live event types selected by the virtual participant 180 in connection with submitting virtual stake submissions 143; the dates/times when the virtual participant 180 has used the collaborative gaming application 155; the geographic locations where the virtual participant 180 has used or accessed the collaborative gaming application 155 or electronic gaming platform 150; the friends or connections of the virtual participant 180 on the electronic gaming platform 150; communications by the virtual participant 180 (e.g., via text, video, audio, or other means) via the electronic platform with other virtual participants 180; live event streaming data accessed by the virtual participant 180; and/or other types of usage activities engaged in by the virtual participant 180.

The participant analysis functions 179 can use some or all of this tracked information to derive additional anlaytics about each virtual participant 180 including some or all of the following: the frequency at which the virtual participant 180 creates virtual contests; the frequency of which the virtual participant 180 joins virtual stake submissions; usage patterns of the virtual participant 180 (e.g., with respect to accessing the collaborative gaming application 155, wager amounts and frequency, deposit amounts and frequency, withdrawal amounts and frequency, etc.); aggregated statistics for the virtual participant 180 (e.g., indicating total wager amounts, total winnings, total losses, total number of contests created, total number contests joined, total numbers of friends or connections, etc.); win/loss percentages the virtual participant 180; and/or other parameters that can be derived from the virtual participant's usage of the collaborative gaming application 155 and/or electronic gaming platform 150.

In response to an administrator requesting details of a virtual participant 180 (e.g., using the unique ID associated with the virtual participant 180), the participant analysis functions 179 can generate one or more analytic displays that includes some or all of the aforementioned data and parameters for presentation to the administrator user. In this manner, the administrator can effectively understand how the virtual participant 180 is using the collaborative gaming application 155 and/or electronic gaming platform 150.

In some examples, the data collected or derived for each virtual participant 180 can be utilized to generate interfaces or displays that are accessible to virtual participants, such as participant ranking features that highlight virtual participants that have received large winnings and/or which have high winning percentages. In other instances, the data collected or derived for a virtual participant 180 can be utilized to perform backend functions, such as to detect or identify anomalous wagering patterns, addiction problems, unauthorized usage, and/or other issues that may be of concern.

The participant analysis functions 179 also can be utilized to generate aggregated analytics, statistics, and/or data for groups of virtual participants 180. Any or all of the aforementioned analytics, statistics, and/or data collected or derived for a given virtual participant 180 can be collectively considered for a group of virtual participants 180 and utilized to generate one or more analytic displays that can be accessed or presented to administrator users and/or virtual participants 180.

In certain embodiments, a computerized system is provided for authenticating virtual participants and processing a virtual multi-participant contest in a network environment. The system comprises one or more processors and one or more non-transitory storage devices, and the one or more processors can be configured to execute instructions stored on the one or more non-transitory storage devices to: (a) provide, via a network, access to an electronic gaming platform that is configured to manage permissions for accessing virtual multi-participant contests; (b) establish, over the network, a first connection between the electronic gaming platform and a first electronic device, wherein the first electronic device executes or accesses a first collaborative gaming application configured in a restricted functionality state that locks one or more functionalities pertaining to the virtual multi-participant contests; (c) authenticate, using a geolocation authentication system of the electronic gaming platform, a first location of the first electronic device; (d) transition the first collaborative gaming application from the restricted functionality state to an unrestricted functionality state based, at least in part, on authenticating the first location of the first electronic device; (e) create, by the first collaborative gaming application configured in the unrestricted functionality state, a virtual multi-participant contest, wherein an outcome of the virtual multi-participant contest is based upon predictions for one or more live events; (f) receive, from the first collaborative gaming application configured in the unrestricted functionality state, a first virtual stake submission for the virtual multi-participant contest, the first virtual stake submission identifying a first live event to be included in the virtual multi-participant contest; (g) establish, over the network, a second connection between the electronic gaming platform and at least one additional electronic device, wherein the at least one additional electronic device executes or accesses a second collaborative gaming application configured in the restricted functionality state that locks the one or more functionalities pertaining to the virtual multi-participant contest created by the first electronic device; (h) authenticate, using the geolocation authentication system of the electronic gaming platform, a second location of the at least one additional electronic device; (i) transition the second collaborative gaming application from the restricted functionality state to the unrestricted functionality state based, at least in part, on authenticating the second location of the at least one additional electronic device, wherein transitioning the second collaborative gaming application to the unrestricted functionality state unlocks the one or more functionalities pertaining to the virtual multi-participant contest created by the first electronic device; (j) receive, from the at least one additional electronic device configured in the unrestricted functionality state, one or more virtual stake submissions for the virtual multi-participant contest created by the first electronic device, each of the one or more virtual stake submissions identifying at least one live event to be associated with the virtual multi-participant contest; (k) receive, by the electronic gaming platform, real-time event data corresponding to the one or more live events associated with the virtual multi-participant contest; and (l) generate, by the electronic gaming platform, evaluation results corresponding to the virtual multi-participant contest, wherein the evaluation results are generated based, at least in part, on the real-time event data corresponding to each the one or more live events and identify the outcome of the multi-participant contest.

In certain embodiments, a computerized method is provided for authenticating virtual participants and processing a virtual multi-participant contest in a network environment. The computerized method is implemented via execution of computing instructions by one or more processing devices and stored on one or more non-transitory computer storage devices. The computerized method comprises: (a) providing, via a network, access to an electronic gaming platform that is configured to manage permissions for accessing virtual multi-participant contests; (b) establishing, over the network, a first connection between the electronic gaming platform and a first electronic device, wherein the first electronic device executes or accesses a first collaborative gaming application configured in a restricted functionality state that locks one or more functionalities pertaining to the virtual multi-participant contests; (c) authenticating, using a geolocation authentication system of the electronic gaming platform, a first location of the first electronic device; (d) transitioning the first collaborative gaming application from the restricted functionality state to an unrestricted functionality state based, at least in part, on authenticating the first location of the first electronic device; (e) creating, by the first collaborative gaming application configured in the unrestricted functionality state, a virtual multi-participant contest, wherein an outcome of the virtual multi-participant contest is based upon one or more live events; (f) receiving, from the first collaborative gaming application configured in the unrestricted functionality state, a first virtual stake submission for the virtual multi-participant contest, the first virtual stake submission identifying a first live event to be included in the virtual multi-participant contest; (g) establishing, over the network, a second connection between the electronic gaming platform and at least one additional electronic device, wherein the at least one additional electronic device executes or accesses a second collaborative gaming application configured in the restricted functionality state that locks the one or more functionalities pertaining to the virtual multi-participant contest created by the first electronic device; (h) authenticating, using the geolocation authentication system of the electronic gaming platform, a second location of the at least one additional electronic device; (i) transition the second collaborative gaming application from the restricted functionality state to the unrestricted functionality state based, at least in part, on authenticating the second location of the at least one additional electronic device, wherein transitioning the second collaborative gaming application to the unrestricted functionality state unlocks the one or more functionalities pertaining to the virtual multi-participant contest created by the first electronic device; (j) receiving, from the at least one additional electronic device configured in the unrestricted functionality state, one or more virtual stake submissions for the virtual multi-participant contest created by the first electronic device, each of the one or more virtual stake submissions identifying at least one live event to be associated with the virtual multi-participant contest; (k) receiving, by the electronic gaming platform, real-time event data corresponding to the one or more live events associated with the virtual multi-participant contest; and (l) generating, by the electronic gaming platform, evaluation results corresponding to the virtual multi-participant contest, wherein the evaluation results identify the outcome of the multi-participant contest based, at least in part, on monitoring the real-time event data corresponding to each the one or more live events.

In certain embodiments, a computerized system is provided for authenticating virtual participants and processing a virtual multi-participant contest in a network environment. The system comprises one or more processors and one or more non-transitory storage devices, and the one or more processors are configured to execute instructions stored on the one or more non-transitory storage devices to: (a) provide, via a network, access to an electronic gaming platform that is configured to manage virtual multi-participant contests; (b) establish, over the network, a first connection between the electronic gaming platform and a first electronic device, wherein the first electronic device executes or accesses a first collaborative gaming application configured in a restricted functionality state that locks one or more functionalities pertaining to the virtual multi-participant contests; (c) authenticate, using a geolocation authentication system of the electronic gaming platform, a first location of the first electronic device; (d) transition the first collaborative gaming application from the restricted functionality state to an unrestricted functionality state based, at least in part, on authenticating the first location of the first electronic device; (e) create, by the first collaborative gaming application configured in the unrestricted functionality state, a virtual multi-participant contest; (f) receive, from the first collaborative gaming application configured in the unrestricted functionality state, a first virtual stake submission for the virtual multi-participant contest, the first virtual stake submission identifying a first live event to be associated with the virtual multi-participant contest; (g) establish, over the network, a second connection between the electronic gaming platform and a second electronic device, wherein the second electronic device executes or accesses a second collaborative gaming application configured in the restricted functionality state that locks the one or more functionalities pertaining to the virtual multi-participant contest created by the first electronic device; (h) authenticate, using the geolocation authentication system of the electronic gaming platform, a second location of the second electronic device; (i) transition the second collaborative gaming application from the restricted functionality state to the unrestricted functionality state based, at least in part, on authenticating the second location of the second electronic device, wherein transitioning the second collaborative gaming application to the unrestricted functionality state unlocks the one or more functionalities pertaining to the virtual multi-participant contest created by the first electronic device; (j) receive, from the second electronic device configured in the unrestricted functionality state, one or more virtual stake submissions for the virtual multi-participant contest created by the first electronic device; (k) receive, by the electronic gaming platform, real-time event data corresponding to the one or more live events associated with the virtual multi-participant contest; and (l) generate, by the electronic gaming platform, evaluation results corresponding to the virtual multi-participant contest based, at least in part, on monitoring the real-time event data corresponding to the one or more live events.

In certain embodiments, a computerized method for authenticating remotely located participants and processing a virtual multi-participant contest in a network environment. The method comprises: (a) providing access over a network to an electronic gaming platform that is configured to manage virtual multi-participant contests; (b) establishing, over the network, a first connection between the electronic gaming platform and a first electronic computing device, wherein the first electronic computing device is configured to execute or access a first collaborative gaming application configured a restricted functionality state that locks one or more functionalities pertaining to the virtual multi-participant contests; (c) authenticating, using a geolocation authentication system of the electronic gaming platform, a first location of the first electronic computing device; (d) transitioning the first collaborative gaming application from the restricted functionality state to an unrestricted functionality state in response to authenticating the first location of the first electronic computing device and verifying location-specific protocols corresponding to the first location; (e) creating, by the first electronic computing device configured in the unrestricted functionality state, a virtual multi-participant contest to be hosted on the electronic gaming platform, wherein: (i) definition criteria for the virtual multi-participant contest specifies a predetermined number of virtual stake submissions to be received in connection with the virtual multi-participant parlay contest and configures the virtual multi-participant contest in a vacancy tolerant mode; (ii) the electronic gaming platform provides a crowdsourced submission framework that enables multiple virtual participants to enter one or more virtual stake submissions into the virtual multi-participant contest; (iii) the geolocation authentication system of the electronic gaming platform authenticates a location of each virtual participant prior to accepting a virtual stake submission from the virtual participant, and verifies location-specific protocols corresponding to the participant's location; (iv) each virtual participant attempting to participate in the virtual multi-participant contest is prevented from entering the virtual stake submission into the virtual multi-participant contest if a corresponding collaborative gaming application utilized by the virtual participant is configured in a restricted functionality state; (v) each virtual participant attempting to participate in the virtual multi-participant parlay is permitted to enter the virtual stake submission into the virtual multi-participant contest if a corresponding collaborative gaming application utilized by the virtual participant is configured in an unrestricted functionality state; and (vi) the vacancy tolerant mode for the virtual multi-participant contest locks each virtual stake submission after entry into the virtual multi-participant parlay contest, and permits the virtual multi-participant contest to remain active in scenarios where less than all of the predetermined number of virtual stake submissions are received prior to an occurrence of live event; and (e) generating, by the electronic gaming platform, evaluation results corresponding to the virtual multi-participant contest.

In certain embodiments, a system comprising one or more server devices accessible over a network. The one or more server devices are configured to: (a) provide access over a network to an electronic gaming platform that is configured to manage virtual multi-participant contests; (b) establish, over the network, a first connection between the electronic gaming platform and a first electronic computing device, wherein the first electronic computing device is configured to execute or access a first collaborative gaming application configured a restricted functionality state that locks one or more functionalities pertaining to the virtual multi-participant contests; (c) authenticate, using a geolocation authentication system of the electronic gaming platform, a first location of the first electronic computing device; (d) transition the first collaborative gaming application from the restricted functionality state to an unrestricted functionality state in response to authenticating the first location of the first electronic computing device and verifying location-specific protocols corresponding to the first location; (e) create, by the first electronic computing device configured in the unrestricted functionality state, a virtual multi-participant contest to be hosted on the electronic gaming platform, wherein: (i) definition criteria for the virtual multi-participant contest specifies a predetermined number of virtual stake submissions to be received in connection with the virtual multi-participant parlay contest and configures the virtual multi-participant contest in a vacancy tolerant mode; (ii) the electronic gaming platform provides a crowdsourced submission framework that enables multiple virtual participants to enter one or more virtual stake submissions into the virtual multi-participant contest; (iii) the geolocation authentication system of the electronic gaming platform authenticates a location of each virtual participant prior to accepting a virtual stake submission from the virtual participant, and verifies location-specific protocols corresponding to the participant's location; (iv) each virtual participant attempting to participate in the virtual multi-participant contest is prevented from entering the virtual stake submission into the virtual multi-participant contest if a corresponding collaborative gaming application utilized by the virtual participant is configured in a restricted functionality state; (v) each virtual participant attempting to participate in the virtual multi-participant parlay is permitted to enter the virtual stake submission into the virtual multi-participant contest if a corresponding collaborative gaming application utilized by the virtual participant is configured in an unrestricted functionality state; and (vi) the vacancy tolerant mode for the virtual multi-participant contest locks each virtual stake submission after entry into the virtual multi-participant parlay contest, and permits the virtual multi-participant contest to remain active in scenarios where less than all of the predetermined number of virtual stake submissions are received prior to an occurrence of live event; and € generate, by the electronic gaming platform, evaluation results corresponding to the virtual multi-participant contest.

In certain embodiments, a computer program product is provided. The computer program product comprises at least one non-transitory computer-readable medium including instructions for causing one or more computer devices to: (a) provide access over a network to an electronic gaming platform that is configured to manage virtual multi-participant contests; (b) establish, over the network, a first connection between the electronic gaming platform and a first electronic computing device, wherein the first electronic computing device is configured to execute or access a first collaborative gaming application configured a restricted functionality state that locks one or more functionalities pertaining to the virtual multi-participant contests; (c) authenticate, using a geolocation authentication system of the electronic gaming platform, a first location of the first electronic computing device; (d) transition the first collaborative gaming application from the restricted functionality state to an unrestricted functionality state in response to authenticating the first location of the first electronic computing device and verifying location-specific protocols corresponding to the first location; (e) create, by the first electronic computing device configured in the unrestricted functionality state, a virtual multi-participant contest to be hosted on the electronic gaming platform, wherein: (i) definition criteria for the virtual multi-participant contest specifies a predetermined number of virtual stake submissions to be received in connection with the virtual multi-participant parlay contest and configures the virtual multi-participant contest in a vacancy tolerant mode; (ii) the electronic gaming platform provides a crowdsourced submission framework that enables multiple virtual participants to enter one or more virtual stake submissions into the virtual multi-participant contest; (iii) the geolocation authentication system of the electronic gaming platform authenticates a location of each virtual participant prior to accepting a virtual stake submission from the virtual participant, and verifies location-specific protocols corresponding to the participant's location; (iv) each virtual participant attempting to participate in the virtual multi-participant contest is prevented from entering the virtual stake submission into the virtual multi-participant contest if a corresponding collaborative gaming application utilized by the virtual participant is configured in a restricted functionality state; (v) each virtual participant attempting to participate in the virtual multi-participant parlay is permitted to enter the virtual stake submission into the virtual multi-participant contest if a corresponding collaborative gaming application utilized by the virtual participant is configured in an unrestricted functionality state; and (vi) the vacancy tolerant mode for the virtual multi-participant contest locks each virtual stake submission after entry into the virtual multi-participant parlay contest, and permits the virtual multi-participant contest to remain active in scenarios where less than all of the predetermined number of virtual stake submissions are received prior to an occurrence of live event; and (e) generate, by the electronic gaming platform, evaluation results corresponding to the virtual multi-participant contest.

In certain embodiments, a computerized method is provided for authenticating remotely located participants and processing a virtual multi-participant contest in a network environment. The method comprises: (a) providing access over a network to an electronic gaming platform that is configured to manage virtual multi-participant parlay contests; (b) establishing, over the network, a first connection between the electronic gaming platform and a first electronic computing device, wherein the first electronic computing device is configured to execute or access a first collaborative gaming application configured a restricted functionality state that locks one or more functionalities pertaining to the virtual multi-participant contests; (c) authenticating, using a geolocation authentication system of the electronic gaming platform, a first location of the first electronic computing device; (d) transitioning the first collaborative gaming application from the restricted functionality state to an unrestricted functionality state in response to authenticating the first location of the first electronic computing device and verifying location-specific protocols corresponding to the first location; (e) creating, by the first electronic computing device configured in the unrestricted functionality state, a virtual multi-participant contest; (f) establishing, over a network, a second connection between the electronic gaming platform and at least one additional electronic computing device, wherein the at least one additional electronic computing device is configured to execute or access a second collaborative gaming application configured in the restricted functionality state that locks one or more functionalities pertaining to the virtual multi-participant contest created by using the first electronic computing device; (g) authenticating, using the geolocation authentication system of the electronic gaming platform, a second location of the at least one additional electronic computing device; (h) transitioning the second collaborative gaming application from the restricted functionality state to the unrestricted functionality state in response to authenticating the second location of the first electronic computing device and verifying location-specific protocols corresponding to the second location; (i) receiving, by the at least one additional electronic computing device configured in the unrestricted functionality state, one or more virtual stake submissions corresponding to the virtual multi-participant contest created by the first electronic computing device; (j) receiving, by the electronic gaming platform, real-time update information corresponding to one or more live events associated with the virtual multi-participant contest; and (k) generating, by the electronic gaming platform, evaluation results corresponding to the virtual multi-participant contest.

In certain embodiments, a system comprises one or more server devices accessible over a network. The one or more server devices are configured to: (a) provide access over a network to an electronic gaming platform that is configured to manage virtual multi-participant parlay contests; (b) establish, over the network, a first connection between the electronic gaming platform and a first electronic computing device, wherein the first electronic computing device is configured to execute or access a first collaborative gaming application configured a restricted functionality state that locks one or more functionalities pertaining to the virtual multi-participant contests; (c) authenticate, using a geolocation authentication system of the electronic gaming platform, a first location of the first electronic computing device; (d) transitioning the first collaborative gaming application from the restricted functionality state to an unrestricted functionality state in response to authenticating the first location of the first electronic computing device and verifying location-specific protocols corresponding to the first location; (e) create, by the first electronic computing device configured in the unrestricted functionality state, a virtual multi-participant contest; (f) establish, over a network, a second connection between the electronic gaming platform and at least one additional electronic computing device, wherein the at least one additional electronic computing device is configured to execute or access a second collaborative gaming application configured in the restricted functionality state that locks one or more functionalities pertaining to the virtual multi-participant contest created by using the first electronic computing device; (g) authenticate, using the geolocation authentication system of the electronic gaming platform, a second location of the at least one additional electronic computing device; (h) transition the second collaborative gaming application from the restricted functionality state to the unrestricted functionality state in response to authenticating the second location of the first electronic computing device and verifying location-specific protocols corresponding to the second location; (i) receive, by the at least one additional electronic computing device configured in the unrestricted functionality state, one or more virtual stake submissions corresponding to the virtual multi-participant contest created by the first electronic computing device; (j) receive, by the electronic gaming platform, real-time update information corresponding to one or more live events associated with the virtual multi-participant contest; and (k) generate, by the electronic gaming platform, evaluation results corresponding to the virtual multi-participant contest.

In certain embodiments, a computer program product comprises at least one non-transitory computer-readable medium including instructions for causing one or more computer devices to: (a) provide access over a network to an electronic gaming platform that is configured to manage virtual multi-participant parlay contests; (b) establish, over the network, a first connection between the electronic gaming platform and a first electronic computing device, wherein the first electronic computing device is configured to execute or access a first collaborative gaming application configured a restricted functionality state that locks one or more functionalities pertaining to the virtual multi-participant contests; (c) authenticate, using a geolocation authentication system of the electronic gaming platform, a first location of the first electronic computing device; (d) transition the first collaborative gaming application from the restricted functionality state to an unrestricted functionality state in response to authenticating the first location of the first electronic computing device and verifying location-specific protocols corresponding to the first location; (e) create, by the first electronic computing device configured in the unrestricted functionality state, a virtual multi-participant contest; (f) establish, over a network, a second connection between the electronic gaming platform and at least one additional electronic computing device, wherein the at least one additional electronic computing device is configured to execute or access a second collaborative gaming application configured in the restricted functionality state that locks one or more functionalities pertaining to the virtual multi-participant contest created by using the first electronic computing device; (g) authenticate, using the geolocation authentication system of the electronic gaming platform, a second location of the at least one additional electronic computing device; (h) transition the second collaborative gaming application from the restricted functionality state to the unrestricted functionality state in response to authenticating the second location of the first electronic computing device and verifying location-specific protocols corresponding to the second location; (i) receive, by the at least one additional electronic computing device configured in the unrestricted functionality state, one or more virtual stake submissions corresponding to the virtual multi-participant contest created by the first electronic computing device; (j) receive, by the electronic gaming platform, real-time update information corresponding to one or more live events associated with the virtual multi-participant contest; and (k) generate, by the electronic gaming platform, evaluation results corresponding to the virtual multi-participant contest.

In certain embodiments, a computerized method is provided for authenticating remotely located participants and processing a virtual multi-participant contest in a network environment. The method comprises: (a) providing access over a network to an electronic gaming platform that is configured to manage virtual multi-participant contests; (b) monitoring, by a workload analyzer of a backend monitoring system associated with the electronic gaming platform, the virtual multi-participant contests, wherein each of the virtual multi-participant contests comprises a plurality of virtual stake submissions corresponding to live events; (c) detecting, by the backend monitoring system of the electronic gaming platform, one or more live events that exceed a predetermined exposure threshold based, at least in part, on an analysis of the virtual stake submissions corresponding to live events; (d) prior to a start time of the one or more live events, designating each of the one or more live events as an exposure event; and (e) generating one or more graphical user interfaces (GUIs) that provide information related to each of the exposure events.

In certain embodiments, the workload analyzer calculates exposure indicators for the live events based, at least in part, on a plurality of exposure-impacting parameters, and the workload analyzer identifies the exposure events, at least in part, by comparing the exposure values associated with live events to the predetermined exposure threshold.

In certain embodiments, the computerized method further comprises presenting, via the one or more GUIs, one or more remediation functions configured to reduce exposure of the electronic gaming platform with respect to each of the exposure events.

In certain embodiments, a system comprises one or more server devices accessible over a network. The one or more server devices are configured to: (a) provide access over a network to an electronic gaming platform that is configured to manage virtual multi-participant contests; (b) monitor, by a workload analyzer of a backend monitoring system associated with the electronic gaming platform, the virtual multi-participant contests, wherein each of the virtual multi-participant contests comprises a plurality of virtual stake submissions corresponding to live events; (c) detect, by the backend monitoring system of the electronic gaming platform, one or more live events that exceed a predetermined exposure threshold based, at least in part, on an analysis of the virtual stake submissions corresponding to live events; (d) prior to a start time of the one or more live events, designate each of the one or more live events as an exposure event; and € generate one or more graphical user interfaces (GUIs) that provide information related to each of the exposure events.

In certain embodiments, a computer program product comprises at least one non-transitory computer-readable medium including instructions for causing one or more computer devices to: (a) provide access over a network to an electronic gaming platform that is configured to manage virtual multi-participant contests; (b) monitor, by a workload analyzer of a backend monitoring system associated with the electronic gaming platform, the virtual multi-participant contests, wherein each of the virtual multi-participant contests comprises a plurality of virtual stake submissions corresponding to live events; (c) detect, by the backend monitoring system of the electronic gaming platform, one or more live events that exceed a predetermined exposure threshold based, at least in part, on an analysis of the virtual stake submissions corresponding to live events; (d) prior to a start time of the one or more live events, designate each of the one or more live events as an exposure event; and (e)

generate one or more graphical user interfaces (GUIs) that provide information related to each of the exposure events.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms “first,” “second,” “third,” “fourth,” and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

As used herein, “approximately” can, in some embodiments, mean within plus or minus ten percent of the stated value. In other embodiments, “approximately” can mean within plus or minus five percent of the stated value. In further embodiments, “approximately” can mean within plus or minus three percent of the stated value. In yet other embodiments, “approximately” can mean within plus or minus one percent of the stated value.

Certain data or functions may be described as “real-time,” “near real-time,” or “substantially real-time” within this disclosure. Any of these terms can refer to data or functions that are processed with a humanly imperceptible delay or minimal humanly perceptible delay. Alternatively, these terms can refer to data or functions that are processed within a specific time interval (e.g., in the order of milliseconds).

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components is for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A computerized system for authenticating virtual participants and processing a virtual multi-participant contest in a network environment, comprising one or more processors and one or more non-transitory storage devices, the one or more processors configured to execute instructions stored on the one or more non-transitory storage devices to:

provide, via a network, access to an electronic gaming platform that is configured to manage permissions for accessing virtual multi-participant contests, wherein the electronic gaming platform stores and executes a multi-device authentication protocol that controls access by multiple electronic devices to each individual virtual multi-participant contest, wherein:

(i) each individual multi-participant contest requires participation by a plurality of virtual participants and execution of the multi-device authentication protocol operates to authorize each mobile electronic device of a corresponding virtual participant prior to participating in the individual virtual multi-participant contest;

(ii) for each individual virtual multi-participant contest, the multi-device authentication protocol evaluates attempts by each of the multiple electronic devices to gain access to the electronic gaming platform and selectively grants or denies access privileges for creating and joining the individual virtual multi-participant contest, whereby the multi-device authentication protocol controls functionality states of a collaborative gaming application installed on each of the multiple electronic devices, and transitions each collaborative gaming application between the functionality states to grant or deny the access privileges associated with creating and joining the individual virtual multi-participant contest based on whether the plurality of virtual participants corresponding electronic devices are validated and determined to be authorized or unauthorized users; and (iii) for each individual virtual multi-participant contest, the multi-device authentication protocol defines and enforces an ordered sequence of events for establishing the individual virtual multi-participant contest, selectively granting access to the individual virtual multi-participant contest by the multiple electronic devices, and enforcing a contest activation threshold defining a number of authorized electronic devices or authorized virtual participants required to activate the individual contest on the electronic platform;

establish, over the network, a first connection between the electronic gaming platform and a first electronic device in accordance with the multi-device authentication protocol, wherein the first electronic device executes or accesses a first collaborative gaming application configured in a restricted functionality state that locks or prevents access to one or more functionalities pertaining to the virtual multi-participant contests;

authenticate, using a geolocation authentication system of the electronic gaming platform, a first location of the first electronic device;

transition, in accordance with the multi-device authentication protocol, the first collaborative gaming application from the restricted functionality state to an unrestricted functionality state based, at least in part, on authenticating the first location of the first electronic device;

create, by the first collaborative gaming application configured in the unrestricted functionality state, a virtual multi-participant contest, wherein an outcome of the virtual multi-participant contest is based upon predictions for one or more live events;

receive, from the first collaborative gaming application configured in the unrestricted functionality state, a first virtual stake submission for the virtual multi-participant contest, the first virtual stake submission identifying a first prediction corresponding to the one or more live events associated with the virtual multi-participant contest;

establish, over the network, at least one additional connection between the electronic gaming platform and at least one additional electronic device in accordance with the multi-device authentication protocol, wherein the at least one additional electronic device executes or accesses at least one additional collaborative gaming application configured in the restricted functionality state that locks or prevents access to at least one functionality pertaining to the virtual multi-participant contest created by the first electronic device;

authenticate, using the geolocation authentication system of the electronic gaming platform, at least one second location corresponding to the at least one additional electronic device;

transition, in accordance with the multi-device authentication protocol, the at least one additional collaborative gaming application from the restricted functionality state to the unrestricted functionality state based, at least in part, on authenticating the at least one second location of the at least one additional electronic device, wherein transitioning the at least one additional collaborative gaming application to the unrestricted functionality state unlocks or permits access to the at least one functionality pertaining to the virtual multi-participant contest created by the first electronic device and, when configured in the unrestricted functionality state, the at least one additional collaborative gaming application is granted joining privileges for participating in the virtual multi-participant contest created by the first collaborative gaming application;

receive, from the at least one additional electronic device configured in the unrestricted functionality state, one or more additional virtual stake submissions for the virtual multi-participant contest created by the first electronic device, each of the one or more additional virtual stake submissions identifying an additional prediction for the one or more live events associated with the virtual multi- participant contest;

receive, by the electronic gaming platform, real-time event data corresponding to the one or more live events associated with the virtual multi-participant contest; and generate, by the electronic gaming platform, evaluation results corresponding to the virtual multi-participant contest, wherein the evaluation results identify the outcome of the virtual multi-participant contest, at least in part, by utilizing the real-time event data to determine an accuracy of one or more of the predictions for the one or more live events associated with the virtual multi-participant contest;

wherein the ordered sequence of events enforced by the multi-device authentication protocol operates to define a sequence in which the virtual contest is accessed by the first collaborative gaming application and the at least one additional collaborative gaming application, and operates to verify the first electronic device and the at least one additional electronic device prior to authorizing the access privileges associated with creating and joining the virtual multi-participant contest.

2. The computerized system of claim 1, wherein:

the first collaborative gaming application is transitioned from the restricted functionality state to the unrestricted functionality state in response to: (i) authenticating the first location of the first electronic device; (ii) accessing location-specific protocols corresponding to the first location; and (iii) verifying the location-specific protocols corresponding to the first location; and the at least one additional collaborative gaming application is transitioned from the restricted functionality state to the unrestricted functionality state in response to: (i) authenticating the at least one second location of the at least one additional electronic device; (ii) accessing location-specific protocols corresponding to the at least one second location; and (iii) verifying the location-specific protocols corresponding to the at least one second location.

3. The computerized system of claim 2, wherein:

the geolocation authentication system stores first location-specific protocols corresponding to the first location and second location-specific protocols corresponding to the at least one second location;

the first location is different from the at least one second location; and the first location-specific protocols corresponding to the first location are different from the second location-specific protocols corresponding to the at least one second location.

4. The computerized system of claim 1, wherein:

the electronic gaming platform hosts the virtual multi-participant contest created by the first electronic device until its completion;

the electronic gaming platform facilitates crowdsourcing of a plurality of virtual stake submissions for the virtual multi-participant contest from a plurality of authorized virtual participants; and the geolocation authentication system authenticates each of the plurality of authorized virtual participants prior to submission of the plurality of virtual stake submissions into the virtual multi-participant contest created by the first electronic device.

5. The computerized system of claim 1, wherein the virtual multi-participant contest created by the first electronic device is configured in a vacancy tolerant mode such that:

in the vacancy tolerant mode, the electronic gaming platform hosting the virtual multi-participant contest maintains the virtual multi-participant contest as active when one or more individual contests within the virtual multi-participant contest remain unfilled prior to commencement of a live event associated with at least one virtual stake submission already entered into the virtual multi-participant contest.

6. The computerized system of claim 5, wherein:

in the vacancy tolerant mode, the electronic gaming platform is configured to accept further virtual stake submissions from authorized virtual participants for the one or more unfilled individual contests subsequent to the commencement of the live event associated with the at least one virtual stake submission; and in the vacancy tolerant mode, the electronic gaming platform prevents entry of further virtual stake submissions in response to determining that the at least one virtual stake submission already entered into the virtual multi-participant contest has resulted in a loss.

7. The computerized system of claim 1, wherein:

in response to the first electronic device creating the virtual multi-participant contest, the electronic gaming platform generates an electronic ticket corresponding to the virtual multi-participant contest;

the electronic ticket is associated with definition criteria that controls how the virtual multi-participant contest is administered by the electronic gaming platform such that:

(i) the definition criteria define a maximum number of individual contests for the virtual multi-participant contest;

(ii) the definition criteria define a unique identifier (ID) to be associated with the virtual multi-participant contest;

(iii) the definition criteria define an outcome allocation policy for allocating winnings or losses among virtual participants of the virtual multi-participant contest; and (iv) the definition criteria enable one or more entry rules to be specified by the first electronic device when the virtual multi-participant contest is created;

throughout a duration of the virtual multi-participant contest, the electronic gaming platform manages the virtual multi-participant contest according to the definition criteria;

one or more interfaces associated with the electronic ticket are updated to display the real-time event data corresponding to each of the one or more live events associated with the virtual multi-participant contest; and throughout a duration of the virtual multi-participant contest, the electronic gaming platform grants access to the electronic ticket by each virtual participant that entered at least one virtual stake submission into the virtual multi-participant contest.

8. The computerized system of claim 1, wherein:

in response to the first electronic device creating the virtual multi-participant contest, the electronic gaming platform generates an electronic ticket corresponding to the virtual multi-participant contest;

throughout a duration of the virtual multi-participant contest, the electronic gaming platform grants access to the electronic ticket by virtual participants that entered at least one virtual stake submission into the virtual multi-participant contest; and the electronic ticket provides one or more participant communication functions that enable the virtual participants that entered at least one virtual stake submission into the virtual multi-participant contest to communicate with each other throughout the duration of the virtual multi-participant contest.

9. The computerized system of claim 1, wherein:

the virtual multi-participant contest created by the first electronic device corresponds to a virtual multi-participant parlay contest;

the electronic gaming platform monitors each of the one or more live events in real-time, or near real-time, using the real-time event data received by the electronic gaming platform;

the electronic gaming platform is configured to render the virtual multi-participant parlay contest as a winner if both the first prediction identified by the first virtual stake submission and the one or more additional predictions identified by the one or more additional virtual stake submissions accurately predict individual outcomes corresponding to the one or more live events; and the electronic gaming platform is configured to render the virtual multi-participant parlay contest as a loser if at least one virtual stake submission within the virtual multi-participant parlay contest inaccurately predicts an individual outcome corresponding to the one or more live events.

10. The computerized system of claim 1, wherein:

the electronic gaming platform selectively grants access rights for viewing real- time video streaming data corresponding to the one or more live events included in the virtual multi-participant contest;

for each virtual participant that entered at least one virtual stake submission into the virtual multi-participant contest, the electronic gaming platform grants access rights for viewing the real-time video streaming data for the one or more live events included in the virtual multi-participant contest; and the electronic gaming platform prohibits access to the real-time video streaming data for the one or more live events included in the virtual multi-participant contest for other virtual participants who have not entered at least one virtual stake submission into the virtual multi-participant contest.

11. The computerized system of claim 1, wherein:

generating evaluation results corresponding to the virtual multi-participant contest includes executing an outcome allocation function that determines how winnings or losses are split among virtual participants who entered at least one virtual stake submission into the virtual multi-participant contest; and the outcome allocation function applies a big favorite adjustment configuration that adjusts the winnings or the losses based, at least in part, on a big favorite threshold defining an odds value that distinguishes between standard odds and more favored odds.

12. The computerized system of claim 11, wherein in response to determining that the outcome of the virtual multi-participant contest results in a loss:

a total loss amount is determined for the virtual multi-participant contest;

each unsuccessful virtual stake submission included the virtual multi-participant contest is allocated a loss portion of the total loss amount;

the big favorite adjustment configuration allocates a greater loss portion of the total loss amount to each unsuccessful virtual stake submission having odds exceeding the big favorite threshold in comparison to the loss portion allocated to each unsuccessful virtual stake submission having odds below the big favorite threshold; and the loss portion allocated to each unsuccessful virtual stake submission is attributed to a corresponding virtual participant that submitted the unsuccessful virtual stake submission.

13. The computerized system of claim 1, wherein:

each virtual stake submission included in the virtual multi-participant contest is associated with a wager amount; and the electronic gaming platform is configured to return the wager amount associated with each virtual stake submission to a respective virtual participant in response to determining that the virtual stake submission is a winner and without waiting for outcome determinations on remaining virtual stake submissions included within the virtual multi-participant contest.

14. The computerized system of claim 1, wherein:

each authorized virtual participant is permitted to enter multiple virtual stake submissions into the virtual multi-participant contest; and an outcome allocation policy determines how winnings or losses are allocated for the virtual multi-participant contest based, at least in part, on a quantity of virtual stake submissions entered by each authorized virtual participant.

15. The computerized system of claim 1, wherein the electronic gaming platform processes the real-time event data pertaining to the one or more live events associated with the virtual multi-participant contest by:

determining a start time for each of the one or more live events;

presenting, via the first collaborative gaming application configured in the unrestricted functionality state and the at least one additional collaborative gaming application configured in the unrestricted functionality state, updates pertaining to one or more live events while the one or more live events are in progress;

determining whether each prediction identified by each virtual stake submission included in the virtual multi-participant contest is accurate based on the real-time event data for the one or more live events; and determining the outcome for the virtual multi-participant contest based on the accuracy of one or more of the predictions for the one or more live events.

16. The computerized system of claim 1, wherein:

an outcome allocation policy determines how winnings or losses are allocated for the virtual multi-participant contest; and a virtual participant associated with the first collaborative gaming application that created the virtual multi-participant contest is allocated an increased amount of winnings relative to winnings allocated to at least one other virtual participant that joined virtual multi-participant contest after its creation.

17. The computerized system of claim 1, wherein transitioning the first collaborative gaming application from the restricted functionality state to the unrestricted functionality state includes:

verifying a first geolocation corresponding to the first electronic device is within one or more authorized geographic regions based on a location signal received from the first electronic device;

determining location-specific protocols corresponding to a geographic region associated with the first geolocation of the first electronic device authenticating the first electronic device using the location-specific protocols;

in response to authenticating the first electronic device, granting permissions to the first collaborative gaming application to access one or more previously disabled user interface functions that facilitate establishment and hosting of one or more virtual multi-participant contests on the electronic gaming platform;

wherein transitioning the at least one additional collaborative gaming application from the restricted functionality state to the unrestricted functionality state includes:

verifying at least one additional geolocation corresponding to the at least one additional electronic device is within the one or more authorized geographic regions based on at least one additional location signal received from the at least one additional electronic device;

determining location-specific protocols corresponding to a geographic region associated with the at least one additional geolocation of the at least one additional electronic device;

authenticate the at least one additional electronic device using the location-specific protocols;

in response to authenticating the at least one additional electronic device, granting permissions to the at least one additional collaborative gaming application to access one or more previously disabled user interface functions for joining the virtual multi-participant contest created by the first electronic device;

wherein the contest activation threshold for the virtual multi-participant contest prevents the virtual multi-participant contest from being activated on the electronic platform until multiple authentication criteria are satisfied including: (i) the first collaborative gaming application installed on the first electronic device is transitioned from the restricted functionality state to the unrestricted functionality state; (ii) the first electronic device creates the virtual multi-participant contest in the unrestricted functionality state; (iii) a second collaborative gaming application installed on a separate electronic device is transitioned from the restricted functionality state to the unrestricted functionality state; and (iv) the second collaborative gaming application joins the virtual multi-participant contest in the unrestricted functionality state.

18. A computerized method for authenticating virtual participants and processing a virtual multi-participant contest in a network environment, wherein the computerized method is implemented via execution of computing instructions by one or more processing devices and stored on one or more non-transitory computer storage devices, the computerized method comprising:

providing, via a network, access to an electronic gaming platform that is configured to manage permissions for accessing virtual multi-participant contests, wherein the electronic gaming platform stores and executes a multi-device authentication protocol that controls access by multiple electronic devices to each individual virtual multi-participant contest, wherein:

(i) each individual virtual multi-participant contest requires participation by a plurality of virtual participants and execution of the multi-device authentication protocol operates to authorize each mobile electronic device of a corresponding virtual participant prior to participating in the individual virtual multi-participant contest;

(ii) for each individual virtual multi-participant contest, the multi-device authentication protocol evaluates attempts by each of the multiple electronic devices to gain access to the electronic gaming platform and selectively grants or denies access privileges for creating and joining the individual virtual multi-participant contest, whereby the multi-device authentication protocol controls functionality states of a collaborative gaming application installed on each of the multiple electronic devices, and transitions each collaborative gaming application between the functionality states to grant or deny the access privileges associated with creating and joining the individual virtual multi-participant contest based on whether the plurality of virtual participants corresponding electronic devices are validated and determined to be authorized or unauthorized users; and (ii) for each individual virtual multi-participant contest, the multi-device authentication protocol defines and enforces an ordered sequence of events for establishing the individual virtual multi-participant contest, selectively granting access to the individual virtual multi-participant contest by the multiple electronic devices, and enforcing a contest activation threshold defining a number of authorized electronic devices or authorized virtual participants required to activate the individual contest on the electronic platform;

establishing, over the network, a first connection between the electronic gaming platform and a first electronic device in accordance with the multi-device authentication protocol, wherein the first electronic device executes or accesses a first collaborative gaming application configured in a restricted functionality state that locks or prevents access to one or more functionalities pertaining to the virtual multi-participant contests;

authenticating, using a geolocation authentication system of the electronic gaming platform, a first location of the first electronic device;

transitioning, in accordance with the multi-device authentication protocol, the first collaborative gaming application from the restricted functionality state to an unrestricted functionality state based, at least in part, on authenticating the first location of the first electronic device;

creating, by the first collaborative gaming application configured in the unrestricted functionality state, a virtual multi-participant contest, wherein an outcome of the virtual multi-participant contest is based upon predictions for one or more live events;

receiving, from the first collaborative gaming application configured in the unrestricted functionality state, a first virtual stake submission for the virtual multi-participant contest, the first virtual stake submission identifying a first prediction corresponding to the one or more live events associated with the virtual multi-participant contest;

establishing, over the network, at least one additional connection between the electronic gaming platform and at least one additional electronic device in accordance with the multi-device authentication protocol, wherein the at least one additional electronic device executes or accesses at least one additional collaborative gaming application configured in the restricted functionality state that locks or prevents access to at least one functionality pertaining to the virtual multi-participant contest created by the first electronic device;

authenticating, using the geolocation authentication system of the electronic gaming platform, at least one second location corresponding to the at least one additional electronic device;

transitioning, in accordance with the multi-device authentication protocol, the at least one additional collaborative gaming application from the restricted functionality state to the unrestricted functionality state based, at least in part, on authenticating the at least one second location of the at least one additional electronic device, wherein transitioning the at least one additional collaborative gaming application to the unrestricted functionality state unlocks or permits access to the at least one functionality pertaining to the virtual multi-participant contest created by the first electronic device and, when configured in the unrestricted functionality state, the at least one additional collaborative gaming application is granted joining privileges for participating in the virtual multi-participant contest created by the first collaborative gaming application;

receiving, from the at least one additional electronic device configured in the unrestricted functionality state, one or more additional virtual stake submissions for the virtual multi-participant contest created by the first electronic device, each of the one or more additional virtual stake submissions identifying an additional prediction for the one or more live events associated with the virtual multi-participant contest;

receiving, by the electronic gaming platform, real-time event data corresponding to the one or more live events associated with the virtual multi-participant contest; and generating, by the electronic gaming platform, evaluation results corresponding to the virtual multi-participant contest, wherein the evaluation results identify the outcome of the virtual multi-participant contest, at least in part, by utilizing the real-time event data to determine an accuracy of one or more of the predictions for the one or more live events associated with the virtual multi-participant contest;

wherein the ordered sequence of events enforced by the multi-device authentication protocol operates to define a sequence in which the virtual contest is accessed by the first collaborative gaming application and the at least one additional collaborative gaming application, and operates to verify the first electronic device and the at least one additional electronic device prior to authorizing the access privileges associated with creating and joining the virtual multi-participant contest.

19. A computerized system for authenticating virtual participants and processing a virtual multi-participant contest in a network environment, comprising one or more processors and one or more non-transitory storage devices, the one or more processors configured to execute instructions stored on the one or more non-transitory storage devices to:

provide, via a network, access to an electronic gaming platform that is configured to manage virtual multi-participant contests, wherein the electronic gaming platform stores and executes a multi-device authentication protocol that controls access by multiple electronic devices to each individual virtual multi-participant contest, wherein:

(i) each individual virtual multi-participant contest requires participation by a plurality of virtual participants and execution of the multi-device authentication protocol operates to authorize each mobile electronic device of a corresponding virtual participant prior to participating in the individual virtual multi-participant contest;

(ii) for each individual virtual multi-participant contest, the multi-device authentication protocol evaluates attempts by each of the multiple electronic devices to gain access to the electronic gaming platform and selectively grants or denies access privileges for creating and joining the individual virtual multi-participant contest, whereby the multi-device authentication protocol controls functionality states of a collaborative gaming application installed on each of the multiple electronic devices, and transitions each collaborative gaming application between the functionality states to grant or deny the access privileges associated with creating and joining the individual virtual multi-participant contest based on whether the plurality of virtual participants corresponding electronic devices are validated and determined to be authorized or unauthorized users; and (iii) for each individual virtual multi-participant contest, the multi-device authentication protocol defines and enforces an ordered sequence of events for establishing the individual virtual multi-participant contest, selectively granting access to the individual virtual multi-participant contest by the multiple electronic devices, and enforcing a contest activation threshold defining a number of authorized electronic devices or authorized virtual participants required to activate the individual contest on the electronic platform;

establish, over the network, a first connection between the electronic gaming platform and a first electronic device in accordance with the multi-device authentication protocol, wherein the first electronic device executes or accesses a first collaborative gaming application configured in a restricted functionality state that locks one or more functionalities pertaining to the virtual multi-participant contests;

authenticate, using a geolocation authentication system of the electronic gaming platform, a first location of the first electronic device;

transition, in accordance with the multi-device authentication protocol, the first collaborative gaming application from the restricted functionality state to an unrestricted functionality state based, at least in part, on authenticating the first location of the first electronic device;

create, by the first collaborative gaming application configured in the unrestricted functionality state, a virtual multi-participant contest;

receive, from the first collaborative gaming application configured in the unrestricted functionality state, a first virtual stake submission for the virtual multi-participant contest, the first virtual stake submission identifying a first live event to be associated with the virtual multi-participant contest;

establish, over the network, a second connection between the electronic gaming platform and a second electronic device in accordance with the multi-device authentication protocol, wherein the second electronic device executes or accesses a second collaborative gaming application configured in the restricted functionality state that locks the at least one functionality pertaining to the virtual multi-participant contest created by the first electronic device;

authenticate, using the geolocation authentication system of the electronic gaming platform, a second location of the second electronic device;

transition, in accordance with the multi-device authentication protocol, the second collaborative gaming application from the restricted functionality state to the unrestricted functionality state based, at least in part, on authenticating the second location of the second electronic device, wherein transitioning the second collaborative gaming application to the unrestricted functionality state unlocks the at least one functionality pertaining to the virtual multi-participant contest created by the first electronic device and, when configured in the unrestricted functionality state, the second collaborative gaming application is granted access to the virtual multi-participant contest created by the first collaborative gaming application;

receive, from the second electronic device configured in the unrestricted functionality state, one or more virtual stake submissions for the virtual multi-participant contest created by the first electronic device;

receive, by the electronic gaming platform, event data corresponding to one or more live events associated with the virtual multi-participant contest; and generate, by the electronic gaming platform, evaluation results corresponding to the virtual multi-participant contest based, at least in part, on the event data corresponding to the one or more live events;

wherein the ordered sequence of events enforced by the multi-device authentication protocol operates to define a sequence in which the virtual contest is accessed by the first collaborative gaming application and the second collaborative gaming application, and operates to verify the first electronic device and the second electronic device prior to authorizing the access privileges associated with creating and joining the virtual multi-participant contest.

* * * * *